United States Patent [19]
Bito et al.

[11] Patent Number: 5,594,502
[45] Date of Patent: Jan. 14, 1997

[54] IMAGE REPRODUCTION APPARATUS

[75] Inventors: Nobutsune Bito; Tomio Tuzuki; Nobuyuki Oda; Akio Mizuno, all of Nagoya, Japan

[73] Assignee: Elmo Company, Limited, Japan

[21] Appl. No.: 392,146

[22] Filed: Feb. 22, 1995

Related U.S. Application Data

[62] Division of Ser. No. 183,051, Jan. 18, 1994.

[30] Foreign Application Priority Data

| Jan. 20, 1993 | [JP] | Japan | 5-26140 |
| Jan. 20, 1993 | [JP] | Japan | 5-26141 |
| Feb. 24, 1993 | [JP] | Japan | 5-61004 |

[51] Int. Cl.$^6$ ........................................... H04N 5/225
[52] U.S. Cl. ........................................ 348/373; 348/207
[58] Field of Search ............................ 348/207, 373, 348/374, 375, 376, 231; 355/64, 21, 67, 70; 352/166; 354/76, 77, 80; H04N 5/225

[56] References Cited

U.S. PATENT DOCUMENTS

| 4,825,295 | 4/1989 | Ishikawa et al. | 348/373 |
| 4,963,986 | 10/1990 | Fukuyama et al. | 348/373 |
| 5,027,219 | 6/1991 | Stuttler et al. | 348/373 |
| 5,164,827 | 11/1992 | Raff | 348/143 |
| 5,247,330 | 9/1993 | Ohyaha et al. | 355/64 |
| 5,365,269 | 11/1994 | Holmes et al. | 348/169 |

*Primary Examiner*—John K. Peng
*Assistant Examiner*—Tuan V. Ho
*Attorney, Agent, or Firm*—Ostrolenk, Faber, Gerb & Soffen, LLP

[57] ABSTRACT

A presentation supporting system is constructed to be space-saving and to allow compact packing under a non-service condition. In the presentation supporting system, the presentation conditions are adjusted adequately without much labor and time. The presentation supporting system of the invention has a table on which a subject matter is placed, a camera head unit for taking a visual image of the subject matter, a camera supporting base member projecting upright from a rear side of the table, and a folding camera supporting arm member to which the camera head unit is fixed. The folding camera supporting arm member is stretched upward under a service condition and is folded under a non-service condition. The presentation supporting system includes a control circuit having an EEPROM which stores settings of control buttons on a front operation panel and a control panel when a key set button is activated. These settings include selection of auxiliary lighting units for reflecting light or a base light unit for transmitting light, a sound output volume, an iris opening, a focal position, a zoom range, settings of a white balance mode and a display mode. The control circuit reads an operating condition of the key set button immediately after power is supplied, and reproduces the settings stored in the EEPROM under an ON condition of the key set button. Under an OFF condition of the key set button the control circuit sets default values.

9 Claims, 35 Drawing Sheets

Fig. 17

| ADDRESS | BIT | ASSIGNMENT |
|---|---|---|
| 0 1 0 0 (OUTPUT) | 0 | POWER INDICATOR LED |
| | 1 | KEY SET INDICATOR LED |
| | 2 | LIGHT INDICATOR LED(TRANSMITTED) |
| | 3 | LIGHT INDICATOR LED(REFLECTED) |
| | 4 | INPUT INDICATOR LED(MAIN UNIT) |
| | 5 | INPUT INDICATOR LED(AUX 1) |
| | 6 | INPUT INDICATOR LED(AUX 2) |
| | 7 | N/C |
| 0 1 0 1 (OUTPUT) | 0 | N/C |
| | 1 | N/C |
| | 2 | AUTO IRIS INDICATOR LED |
| | 3 | MANUAL IRIS INDICATOR LED |
| | 4 | AUTO FOCUS INDICATOR LED |
| | 5 | MANUAL FOCUS INDICATOR LED |
| | 6 | ZOOM MODE A INDICATOR LED |
| | 7 | ZOOM MODE B INDICATOR LED |
| 0 1 0 2 (INPUT) | 0 | INPUT 0 |
| | 1 | INPUT 1 |
| | 2 | INPUT 2 |
| | 3 | INPUT 3 |
| | 4 | INPUT 4 |
| | 5 | INPUT 5 |
| | 6 | INPUT 6 |
| | 7 | INPUT 7 |

Fig. 18

| ADDRESS | BIT | ASSIGNMENT |
|---|---|---|
| 0 1 0 2<br>L 0 = 1<br>L 1 = 0<br>L 2 = 0 | 0 | N/C |
| | 1 | LIGHTING SELECTOR |
| | 2 | INPUT AV SELECTOR |
| | 3 | N/C |
| | 4 | N/C |
| | 5 | MIC VOLUME CONTROL (DOWN) |
| | 6 | MIC VOLUME CONTROL (UP) |
| | 7 | AUTO/MANUAL IRIS SELECTOR |
| 0 1 0 2<br>L 0 = 0<br>L 1 = 1<br>L 2 = 0 | 0 | IRIS CONTROL (OUT) |
| | 1 | IRIS CONTROL (IN) |
| | 2 | AUTO FOCUS BUTTON |
| | 3 | MANUAL FOCUS CONTROL (SHORT) |
| | 4 | MANUAL FOCUS CONTROL (LONG) |
| | 5 | ZOOM MODE SELECTOR |
| | 6 | ZOOM UP BUTTON |
| | 7 | WIDE ZOOM BUTTON |
| 0 1 0 2<br>L 0 = 0<br>L 1 = 0<br>L 2 = 1 | 0 | WHITE BALANCE MODE SELECTOR |
| | 1 | NEGA/POSI SELECTOR |
| | 2 | COLOR/B&W SELECTOR |
| | 3 | GAIN SELECTOR |
| | 4 | COLOR BAR ON/OFF BUTTON |
| | 5 | DETAIL STRESS ON/OFF BUTTON |
| | 6 | KEY SET BUTTON |
| | 7 | COMMUNICATION ON/OFF BUTTON |

Fig. 19

| ADDRESS | BIT | ASSIGNMENT |
|---|---|---|
| 0200 (OUTPUT) | 0 | AUTO WHITE BALANCE INDICATOR LED |
| | 1 | MANUAL WHITE BALANCE INDICATOR LED |
| | 2 | NEGATIVE INDICATOR LED |
| | 3 | POSITIVE INDICATOR LED |
| | 4 | COLOR INDICATOR LED |
| | 5 | B&W INDICATOR LED |
| | 6 | GAIN 0 INDICATOR LED |
| | 7 | GAIN 9dB INDICATOR LED |
| 0201 (OUTPUT) | 0 | N/C |
| | 1 | COLOR BAR INDICATOR LED |
| | 2 | DETAIL STRESS ON INDICATOR LED |
| | 3 | DETAIL STRESS OFF INDICATOR LED |
| | 4 | 0102 ADDRESS SELECTION L0 |
| | 5 | 0102 ADDRESS SELECTION L1 |
| | 6 | 0102 ADDRESS SELECTION L2 |
| | 7 | COMMUNICATION INDICATOR LED |
| 0202 (OUTPUT) | 0 | N/C |
| | 1 | N/C |
| | 2 | DETAIL CONTROL OUTPUT |
| | 3 | WHITE BALANCE CONTROL OUTPUT |
| | 4 | NEGA/POSI CONTROL OUTPUT |
| | 5 | COLOR/B&W CONTROL OUTPUT |
| | 6 | GAIN CONTROL OUTPUT |
| | 7 | COLOR BAR CONTROL OUTPUT |

Fig. 20

| ADDRESS | BIT | ASSIGNMENT |
|---|---|---|
| 0300 (OUTPUT) | 0 | UPPER LIGHTING UNIT CONTROL OUTPUT |
| | 1 | LOWER LIGHTING UNIT CONTROL OUTPUT |
| | 2 | FOCUS ON CONTROL OUTPUT |
| | 3 | SHORT FOCUS CONTROL OUTPUT |
| | 4 | LONG FOCUS CONTROL OUTPUT |
| | 5 | ZOOM UP CONTROL OUTPUT |
| | 6 | WIDE ZOOM CONTROL OUTPUT |
| | 7 | POWER CONTROL OUTPUT |
| 0301 (OUTPUT) | 0 | IRIS DATA B0 |
| | 1 | IRIS DATA B1 |
| | 2 | IRIS DATA B2 |
| | 3 | IRIS DATA B3 |
| | 4 | IRIS DATA B4 |
| | 5 | IRIS DATA B5 |
| | 6 | INPUT AV SELECTOR SIGNAL B0 |
| | 7 | INPUT AV SELECTOR SIGNAL B1 |
| 0302 (OUPUT) | 0 | MIC VOLUME DATA B0 |
| | 1 | MIC VOLUME DATA B1 |
| | 2 | MIC VOLUME DATA B2 |
| | 3 | MIC VOLUME DATA B3 |
| | 4 | MIC VOLUME DATA B4 |
| | 5 | MIC VOLUME DATA B5 |
| | 6 | ZOOM MODE A CONTROL OUTPUT |
| | 7 | ZOOM MODE B CONTROL OUTPUT |

Fig. 21

| ADDRESS | BIT | ASSIGNMENT |
|---|---|---|
| 0400 (INPUT) | 0 | N/C |
| | 1 | CAMERA DIRECTION CONTROL (CENTER) |
| | 2 | CAMERA DIRECTION CONTROL (FORWARD) |
| | 3 | CAMERA DIRECTION CONTROL (BACKWARD) |
| | 4 | CAMERA DIRECTION CONTROL (LEFTWARD) |
| | 5 | CAMERA DIRECTION CONTROL (RIGHTWARD) |
| | 6 | N/C |
| | 7 | N/C |
| 0401 (OUTPUT) | 0 | CAMERA DIRECTION INDICATOR LED(CENTER) |
| | 1 | CENTRAL CONTROL OUTPUT LED(FRONT-REAR DIRECTION) |
| | 2 | FRONT-REAR DIRECTION DATA B0 |
| | 3 | FRONT-REAR DIRECTION DATA B1 |
| | 4 | FRONT-REAR DIRECTION DATA B2 |
| | 5 | FRONT-REAR DIRECTION DATA B3 |
| | 6 | FRONT-REAR DIRECTION DATA B4 |
| | 7 | FRONT-REAR DIRECTION DATA B5 |
| 0402 (OUTPUT) | 0 | N/C |
| | 1 | CENTRAL CONTROL OUTPUT (LEFT-RIGHT DIRECTION) |
| | 2 | LEFT-RIGHT DIRECTION DATA B0 |
| | 3 | LEFT-RIGHT DIRECTION DATA B1 |
| | 4 | LEFT-RIGHT DIRECTION DATA B2 |
| | 5 | LEFT-RIGHT DIRECTION DATA B3 |
| | 6 | LEFT-RIGHT DIRECTION DATA B4 |
| | 7 | LEFT-RIGHT DIRECTION DATA B5 |

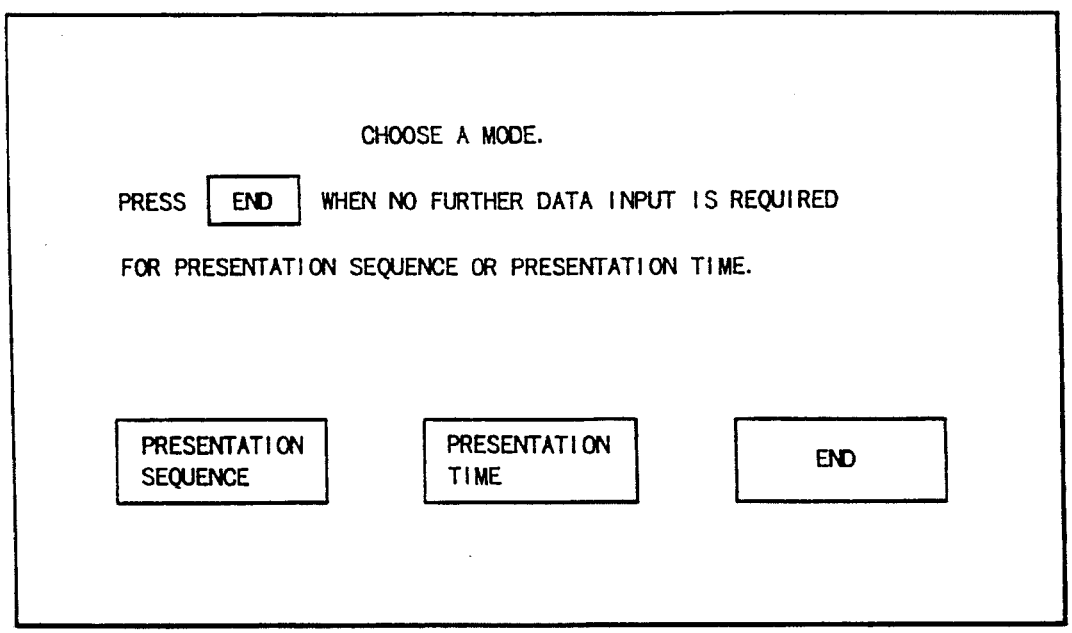

Fig. 31

```
         INPUT PRESENTATION TIME

SEQUENCE NUMBER CONDITIONS                          TIME
                                                    (sec)
    1      XX   NEGATIVE  SIZE XX   ZOOM XX   [XXX]
    2      XX   POSITIVE  SIZE XX   ZOOM XX   [XXX]
    3      XX   NEGATIVE  SIZE XX   ZOOM XX   [XXX]
    4      XX   POSITIVE  SIZE XX   ZOOM XX   [XXX]
    5      XX   POSITIVE  SIZE XX   ZOOM XX   [XXX]
    6      XX   NEGATIVE  SIZE XX   ZOOM XX   [XXX]
    7      XX   POSITIVE  SIZE XX   ZOOM XX   [XXX]
    8      XX   NEGATIVE  SIZE XX   ZOOM XX   [XXX]
    9      XX   POSITIVE  SIZE XX   ZOOM XX   [XXX]
   10      XX   POSITIVE  SIZE XX   ZOOM XX   [XXX]
```

[PREVIOUS PAGE]  [NEXT PAGE]  [s/m]  [END]

Fig. 32

```
     PRESENTATION SEQUENCE, TIME, AND CONDITIONS CURRENTLY SET

SEQUENCE NUMBER CONDITIONS                         TIME
                                                   (sec)
    1      XX   NEGATIVE  SIZE XX   ZOOM XX   XXX
    2      XX   POSITIVE  SIZE XX   ZOOM XX   XXX
    3      XX   NEGATIVE  SIZE XX   ZOOM XX   XXX
    4      XX   POSITIVE  SIZE XX   ZOOM XX   XXX
    5      XX   POSITIVE  SIZE XX   ZOOM XX   XXX
    6      XX   NEGATIVE  SIZE XX   ZOOM XX   XXX
    7      XX   POSITIVE  SIZE XX   ZOOM XX   XXX
    8      XX   NEGATIVE  SIZE XX   ZOOM XX   XXX
    9      XX   POSITIVE  SIZE XX   ZOOM XX   XXX
   10      XX   POSITIVE  SIZE XX   ZOOM XX   XXX
```

[PREVIOUS PAGE]  [NEXT PAGE]  [END]

Fig. 36

CURRENT PRESENTATION CONDITIONS

PRESENTATION CONDITION NUMBER ··· XX

TYPE OF MATERIAL ··· XX

SIZE OF MATERIAL ··· XX

POSITION OF DISPLAY ··· XX

ZOOM VIEW ANGLE ··· XX

END

Fig. 37

CURRENT PRESENTATION CONDITIONS

PRESENTATION SEQUENCE NUMBER ··· XX

PRESENTATION CONDITION NUMBER ··· XX

TYPE OF MATERIAL ··· XX

SIZE OF MATERIAL ··· XX

POSITION OF DISPLAY ··· XX

ZOOM VIEW ANGLE ··· XX

PREVIOUS

NEXT

END

Fig. 38

```
CURRENT PRESENTATION CONDITIONS

PRESENTATION SEQUENCE NUMBER    ...    XX

PRESENTATION CONDITION NUMBER   ...    XX

TYPE OF MATERIAL                ...    XX

SIZE OF MATERIAL                ...    XX

POSITION OF DISPLAY             ...    XX

ZOOM VIEW ANGLE                 ...    XX

PRESENTATION TIME               ...    XXXX(sec)      STOP

TIME ELAPSED                    ...    XXXX(sec)
```

IMAGE REPRODUCTION APPARATUS

This is a division of application Ser. No. 08/183,051, filed Jan. 18, 1994, pending.

BACKGROUND OF THE INVENTION

1. Field of the Invention

The present invention relates to a presentation supporting system which takes a visual image of a material placed on a table with a video camera and outputs a reproduction image representing the material to an external display unit, and also to a control device used in the presentation supporting system.

2. Description of the Related Art

Over-head projectors (OHP) are most popular visual presenters used in a variety of fields. With significant improvement of CCD (charge coupled device) cameras, novel presentation supporting systems using a CCD camera have been developed and proposed. In such a presentation supporting system, a visual image of a material, a sample, or another subject matter placed on a table is taken with a CCD camera disposed above the table, and is output as video signals to an external television set or video tape recorder. Stationary presentation supporting systems generally include a video camera such as a 3-plate CCD camera which requires a relatively large space.

In the presentation supporting system with a large-sized CCD camera for expanding a shooting range, the CCD camera with a certain lens system should be held with an arm member a predetermined distance apart from the material on the table to ensure a required shooting distance. This makes the whole presentation supporting system undesirably large and bulky. Such large-sized presentation supporting systems do not cause significant problems in the process of presentation, but cause bulky packaging and difficulty in shipment and require a large space for storage.

The above problem may be solved by an improved structure where the arm member for holding the CCD camera is folded from its base as a support arm of a condenser of the OHP. This improved system still has a problem that a long arm member for holding the CCD camera at a certain position sufficiently apart from the table is partly located out of the table under the folded condition. This requires a packaging box to have a relatively complicated shape.

A novel presentation supporting system which can be compactly stored and packed in a simple shape of a packaging box has accordingly been required.

With rapid development of image processing technology, advanced functions have been added to the presentation supporting system.

In a typical presentation supporting system with advanced functions, the operator can arbitrarily set presentation conditions including selection of lighting, selection of data input, the iris conditions, selection of either B&W display or color display, and the color balance. The presentation conditions further include the amplification or sound volume when a microphone can be connected to the presentation supporting system. The operator can also select an external display system for showing a reproduction image out of plural options or an input system of video signals out of plural options. In the multi-functional presentation supporting system, effective presentation including clear reproduction is attained through adequate adjustment of these presentation conditions.

With significant increase in the presentation conditions, a relatively long time is required for adjustment of these conditions. For example, when the material placed on the table is a type-written sheet or sample, an auxiliary lighting unit disposed above the table is generally used as a reflected light source. When the material is a X-ray film or slide, on the other hand, a base light unit built in the table is generally used as a transmitted light source. The iris control and the color balance should also be varied according to the type of the material. These conditions are generally adjusted by operating a variety of switches mounted on the presentation supporting system. These is, however, a problem that the presentation conditions once set by an operator, for example, for X-ray films are returned to the initial settings every time when the power is turned off, or are changed to other conditions when another operator uses the system to show another type of material.

In actual presentation, a plurality of materials should be shown within a short time period. The materials used in presentation are prepared to meet an identical set of presentation conditions since manual adjustment of the presentation conditions requires a relatively long time. In other cases, a plurality of presentation supporting systems are used to show different types of materials.

SUMMARY OF THE INVENTION

One object of the present invention is thus to provide a novel presentation supporting system which is sufficiently space-saving and allows compact packing while the system is in a non-service condition.

Another object of the invention is to provide a presentation supporting system wherein presentation conditions can be adjusted adequately without much labor and time.

The above and other related objects are realized by a presentation supporting system of the invention including a video camera for taking an image of a material, a sample, or another subject matter placed on a table, and a retention unit for supporting the video camera at a predetermined camera position for taking an image of the subject matter placed on the table. Image signals representing the image of the subject matter taken by the video camera are transmitted to an external display unit for showing a reproduction image of the subject matter. The retention unit further includes a camera supporting base member fixed to the table, a camera supporting arm member on which the video camera is mounted, and an arm joint member for joining the camera supporting arm member with the camera supporting base member to allow the camera supporting arm member to fold towards the table at a predetermined joint of the camera supporting arm member with the camera supporting base member so as to move the video camera from the predetermined camera position to a center position directly above the table.

In the presentation supporting system of the invention, the retention unit for holding the video camera at a predetermined camera position includes the camera supporting base member fixed to the table and the camera supporting arm member on which the video camera is mounted. The arm joint member joins the camera supporting arm member with the camera supporting base member to allow the camera supporting arm member to fold towards the table. By folding the camera supporting arm member, the video camera is moved from the predetermined camera position to a resting position directly above the table.

In another embodiment, a presentation supporting system of the invention includes a camera unit for taking an image of a material, a sample, or another subject matter placed on a table. Image signals representing the image of the subject matter taken by the camera unit are transmitted to an external display unit for showing a reproduction image of the subject matter. The presentation supporting system further includes a presentation condition adjustment unit for adjusting a presentation condition for the subject matter, a memory unit for storing the presentation condition adjusted by the presentation condition adjustment unit when a predetermined first condition is fulfilled, and a presentation condition recovery unit for resuming the presentation condition stored in the memory unit when a predetermined second condition different from the predetermined first condition is fulfilled.

In the presentation supporting system of the invention thus constructed, the presentation condition adjusted by the presentation condition adjustment unit is stored in the memory unit when a predetermined first condition is fulfilled, for example, when a power source is turned off, when a memory switch is pressed on, or when a process of adjusting the presentation condition is implemented. The presentation condition recovery unit resumes the presentation condition stored in the memory unit when a predetermined second condition different from the predetermined first condition is fulfilled, for example, immediately after the power source is turned on or when a recovery switch is pressed on. This structure allows the desired presentation condition to be easily recovered according to the requirements.

In still another application, a presentation supporting system of the invention having a camera unit for taking a visual image of a material, a sample, or another subject matter placed on a table wherein an image signal representing the visual image of the subject matter taken by the camera unit is transmitted to an external display unit for showing a reproduction image of the subject matter, includes a presentation condition adjustment unit for adjusting a presentation condition for the subject matter, a memory unit for storing a plurality of presentation conditions adjusted by the presentation condition adjustment unit, a presentation condition selection unit for selecting one of the plurality of presentation conditions stored in the memory unit, and a presentation condition setting unit for setting the presentation condition selected by the presentation condition selection unit in the presentation supporting system.

In the presentation supporting system of the embodiment thus constructed, the presentation condition adjustment unit adjusts a presentation condition for the material placed on the table while the memory unit stores a plurality of presentation conditions thus adjusted. The presentation condition selection unit selects one presentation condition out of the plurality of conditions stored in the memory unit. The presentation condition setting unit sets the selected presentation condition in the presentation supporting system. The presentation condition suitable for the subject matter is easily set by selecting only one presentation condition out of the plurality of conditions adjusted previously.

The present invention is also directed to a controller device used for a presentation supporting system for taking a visual image of a material, a sample, or another subject matter placed on a table and outputting an image signal representing the visual image of the subject matter to an external display unit to show a reproduction image of the subject matter. The controller device includes a memory unit for storing a plurality of presentation conditions for showing the reproduction image of the subject matter sent from the presentation supporting system; a presentation condition selection unit for selecting a presentation condition out of the plurality of presentation conditions stored in the memory unit, and a presentation condition control unit for controlling the presentation supporting system based on the presentation condition selected by the presentation condition selection unit.

The controller device of the invention is connected to the presentation supporting system to store a plurality of presentation conditions in the memory unit, select a desirable one out of the plurality of conditions with the presentation condition selection unit, and set the presentation supporting system in the desirable condition with the presentation condition control unit.

These and other objects, features, aspects, and advantages of the present invention will become more apparent from the following detailed description of the preferred embodiment with the accompanying drawings.

BRIEF DESCRIPTION OF THE DRAWINGS

FIG. 17 shows allocation and bit assignment of a first I/O port 311;

FIG. 18 shows bit assignment at an address 0102(H) of the first I/O port 311;

FIG. 19 shows allocation and bit assignment of a second I/O port 312;

FIG. 20 shows allocation and bit assignment of a third I/O port 313;

FIG. 21 shows allocation and bit assignment of a fourth I/O port 314;

FIG. 29 shows a mode selector menu G2 displayed on the screen 410;

FIG. 30 shows a presentation sequence input menu G3 displayed on the screen 410;

FIG. 31 shows a presentation time input menu G4 displayed on the screen 410;

FIG. 32 shows a list G5 of the current presentation sequence, conditions and time periods displayed on the screen 410;

FIG. 36 shows a list T3 of the current presentation conditions displayed on the screen 410;

FIG. 37 shows a menu T4 for changing presentation conditions displayed on the screen 410; and FIG. 38 shows a list T5 of the current presentation conditions and time displayed on the screen 410.

DESCRIPTION OF THE PREFERRED EMBODIMENT

Figure 1:
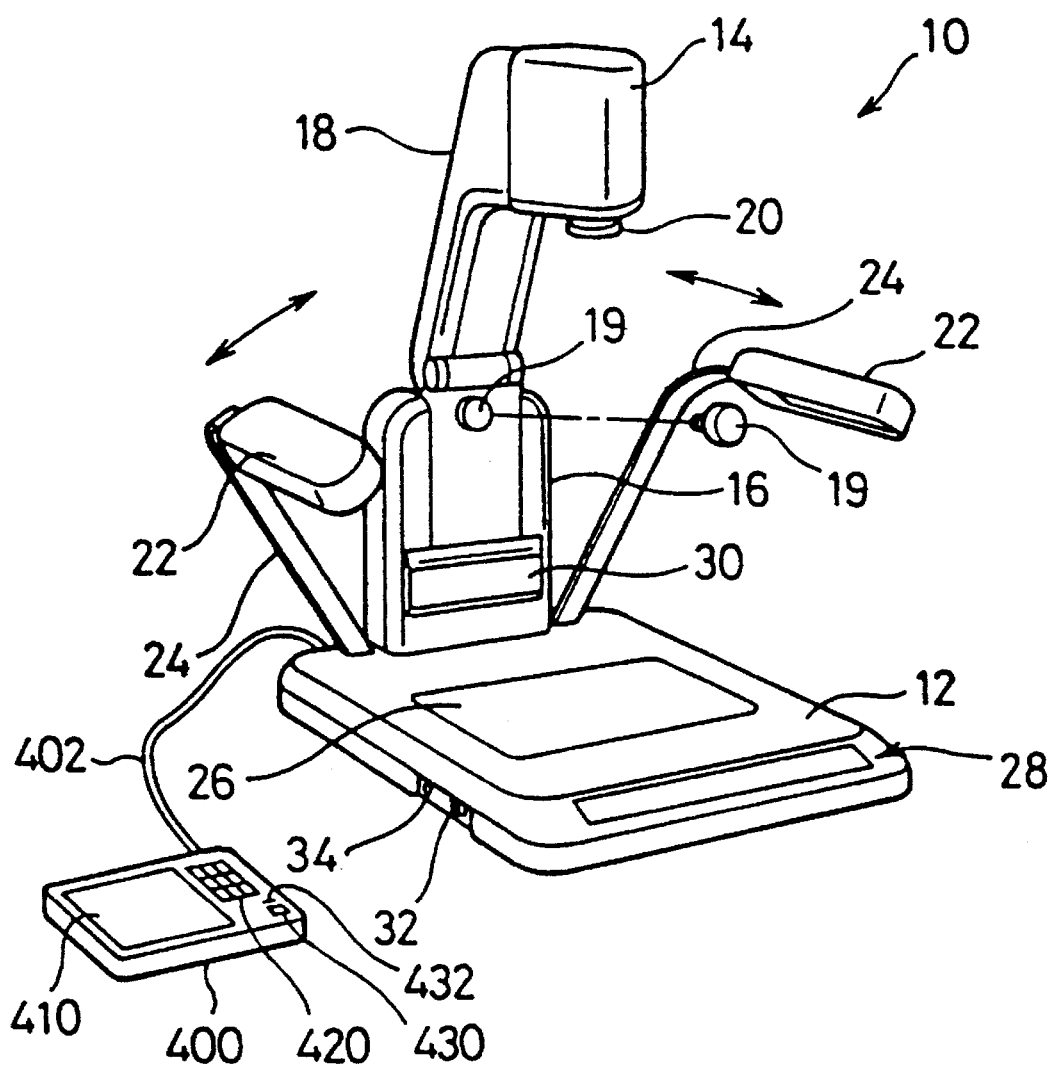
FIG. 1 is a perspective view illustrating a presentation supporting system 10 embodying the invention with an external controller 400.

The structures and features of the invention will be described more in detail based on a preferred embodiment of the invention with accompanying drawings. FIG. 1 is a perspective view illustrating a presentation supporting system 10 of a first embodiment under operating conditions.

As clearly seen in FIG. 1, the presentation supporting system 10 includes a table 12 on which a subject matter is placed, a camera head unit 14 for taking a visual image of the subject matter, a camera supporting base member 16 projecting upright from a rear side of the table 12, and a folding camera supporting arm member 18 to which the camera head unit 14 is fixed. Under a service condition, the folding camera supporting arm member 18 is stretched upward and securely fixed to the camera supporting base member 16 with a fixation screw 19.

In the presentation supporting system 10 under operating conditions, the camera head unit 14 is held at a certain camera position above the table 12 by the camera supporting base member 16 and the camera supporting arm member 18, so that a lens of a video camera 20 is directed to a shooting position on a top face of the table 12. While the camera head unit 14 is held at the certain camera position, the video camera 20 takes a visual image of any of a variety of materials, including two-dimensional objects such as prints and negative films and three-dimensional objects and models, placed on the table 12. In this embodiment, the size of the table 12 is 630 mm×460 mm. When the camera head unit 14 is held in such an operating position, a height H of the presentation supporting system 10, that is, a distance from the table 12 to a top of the camera head unit 14, is 740 mm (see FIG. 5).

The presentation supporting system 10 further includes two auxiliary lighting units 22 disposed on both sides of the camera supporting base member 16 for lighting the subject matter placed on the table 12. The auxiliary lighting units 22 function as a reflected light source with respect to the subject matter placed on the table 12. The auxiliary lighting units 22 are fixed to a rear portion of the table 12 via a pair of holding arms 24 to allow a pivotal movement of each auxiliary lighting units 22 within a pivotable range of 30 degrees from each side face of the camera supporting base member 16. The auxiliary lighting units 22 can be maintained at any desirable lighting position within the pivotable range.

The presentation supporting system 10 is also provided with a transmitted light source (not shown) on an approximate center of the table 12 to take an image of a negative film with the transmitted light. The transmitted light source is disposed below a light diffusing panel 26 having an upper face which is located on a plane horizontally extending from an upper face of the table 12. The presentation supporting system 10 further includes a front operation panel 28 having a variety of control buttons generally used in projection of the subject matter and a control panel 29 having a variety of control knobs and buttons used for fine adjustment of the color balance, control of the white balance, gain, negative/positive conversion and the like. The front operation panel 28 frequently used for adjustment is located on an inclined front face of the table 12 for convenience of operation. The control panel 29 having controls for adjusting the white balance, gain, color balance, hue, and the like is not used frequently in projection of the subject matter and thereby disposed in a recess of the camera supporting base member 16 which is generally closed with a front cover 30. A power switch 32 and a microphone terminal 34 are mounted on a recess of a left side of the table 12.

The presentation supporting system 10 is connected to an external controller 400 via a communication cable 402. The external controller 400 includes a screen 410 functioning as a normal liquid-crystal display and a touch panel for data input, a ten-key pad 420 for numerical data input, a power switch 430 for turning the controller 400 on and off, and a power indicator 432 which is lit when the power switch 430 is ON. The structure of the external controller 400 will be described in more detail below.

Figure 2:
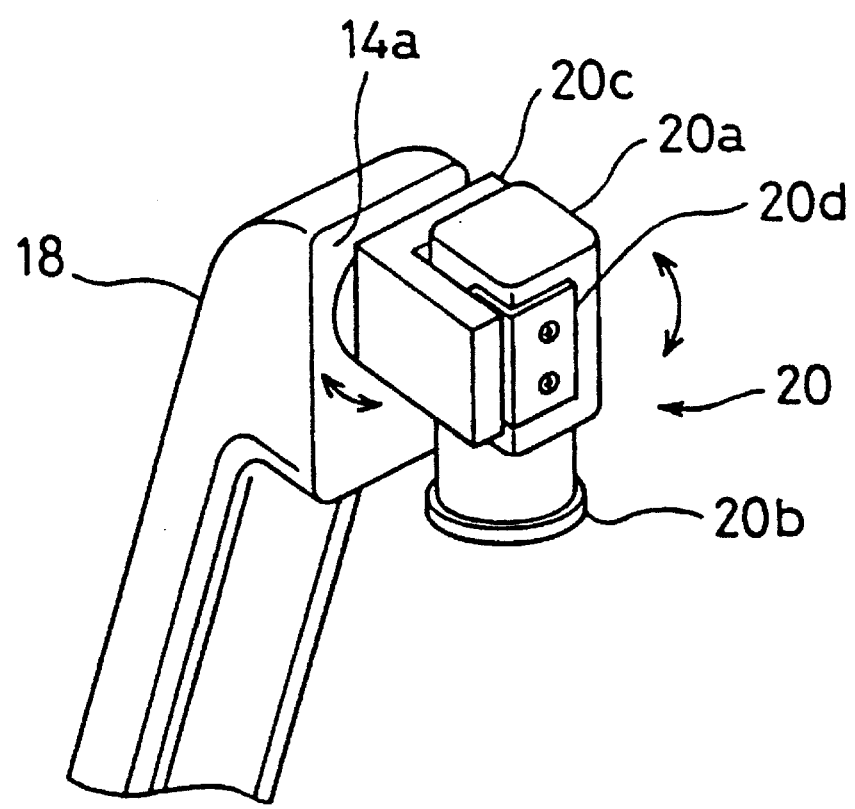
FIG. 2 shows an exemplified structure of a camera head unit 14 incorporated in the presentation supporting system 10 of the embodiment.

As shown in FIG. 2, the video camera 20 built in the camera head unit 14 includes a camera body 20a and a lens unit 20b which are fixed to a holding member 14a of the camera head unit 14 via an arm member 20c. The holding member 14a has a first camera direction adjusting motor (not shown) which rotatably moves the video camera 20 leftward and rightward with respect to the table 12. The arm member 20c includes a second camera direction adjusting motor (not shown) which rotatably moves the camera body 20a together with a fixation member 20d used for fixing the camera body 20a forward and backward with respect to the table 12. With the first and second camera direction adjusting motors, the video camera 20 is adequately directed to the subject matter placed at a desired position on the table 12.

Fixation of the camera supporting arm member 18 to the camera supporting base member 16 with the fixation screw 19 is described more in detail.

Figure 3:
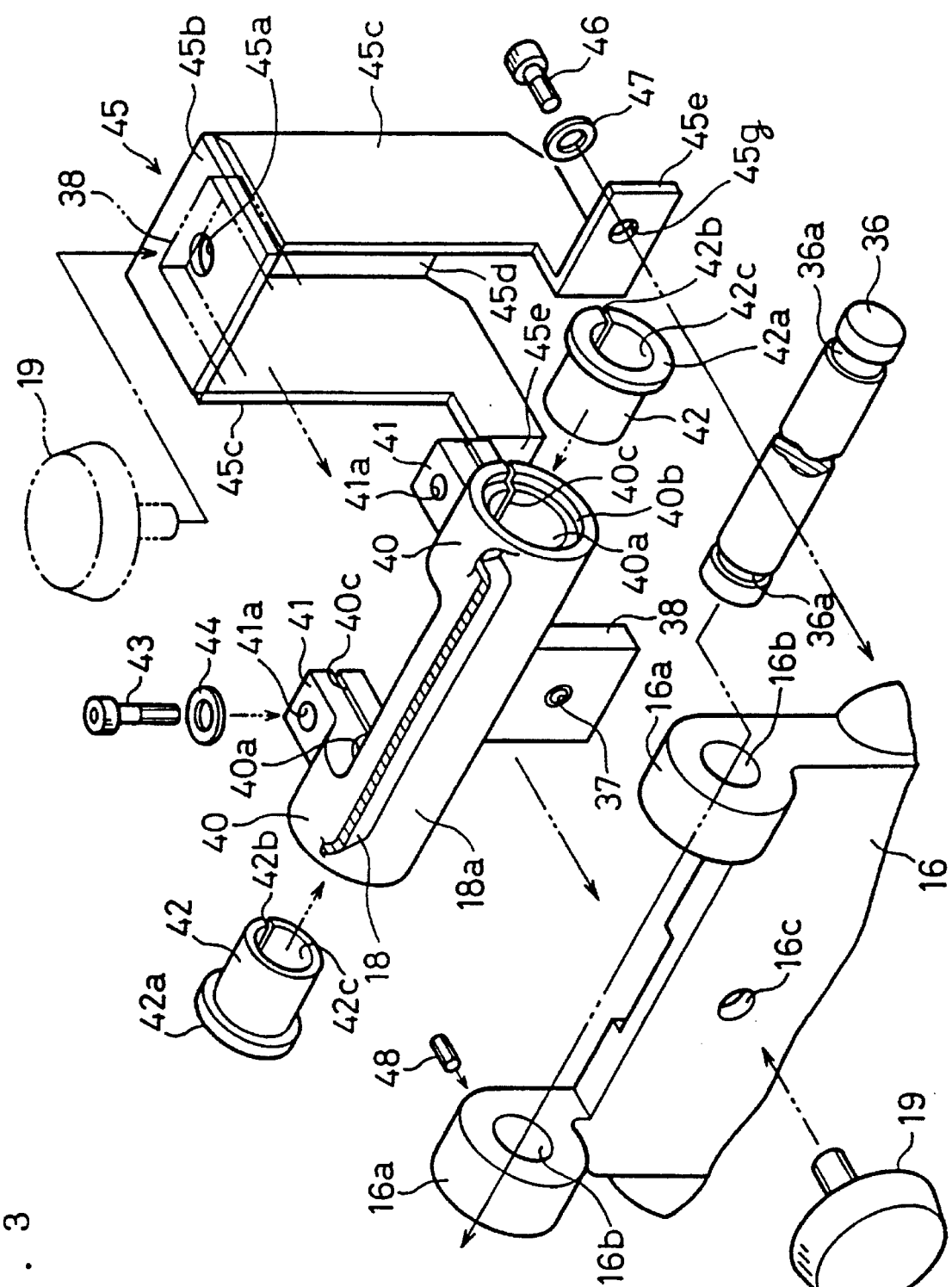
FIG. 3 is a decomposed perspective view showing a connecting structure of a camera supporting base member 16 with a camera supporting arm member 18 in the presentation supporting system 10 of the embodiment.
Figure 4:
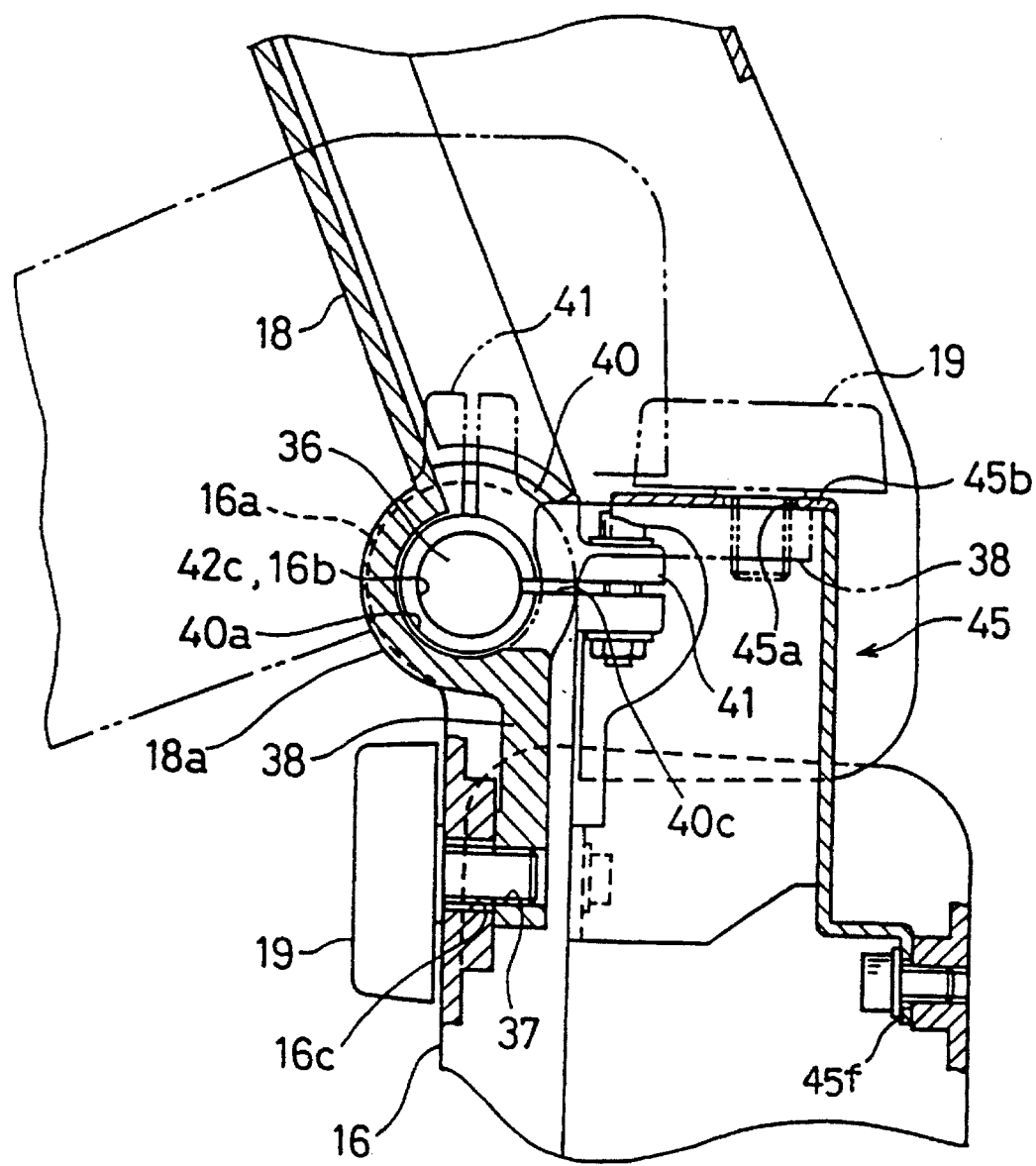
FIG. 4 illustrates a joint of the camera supporting arm member 18 with the camera supporting base member 16 under a service condition and a non-service condition of the presentation supporting system 10.
Figure 5:
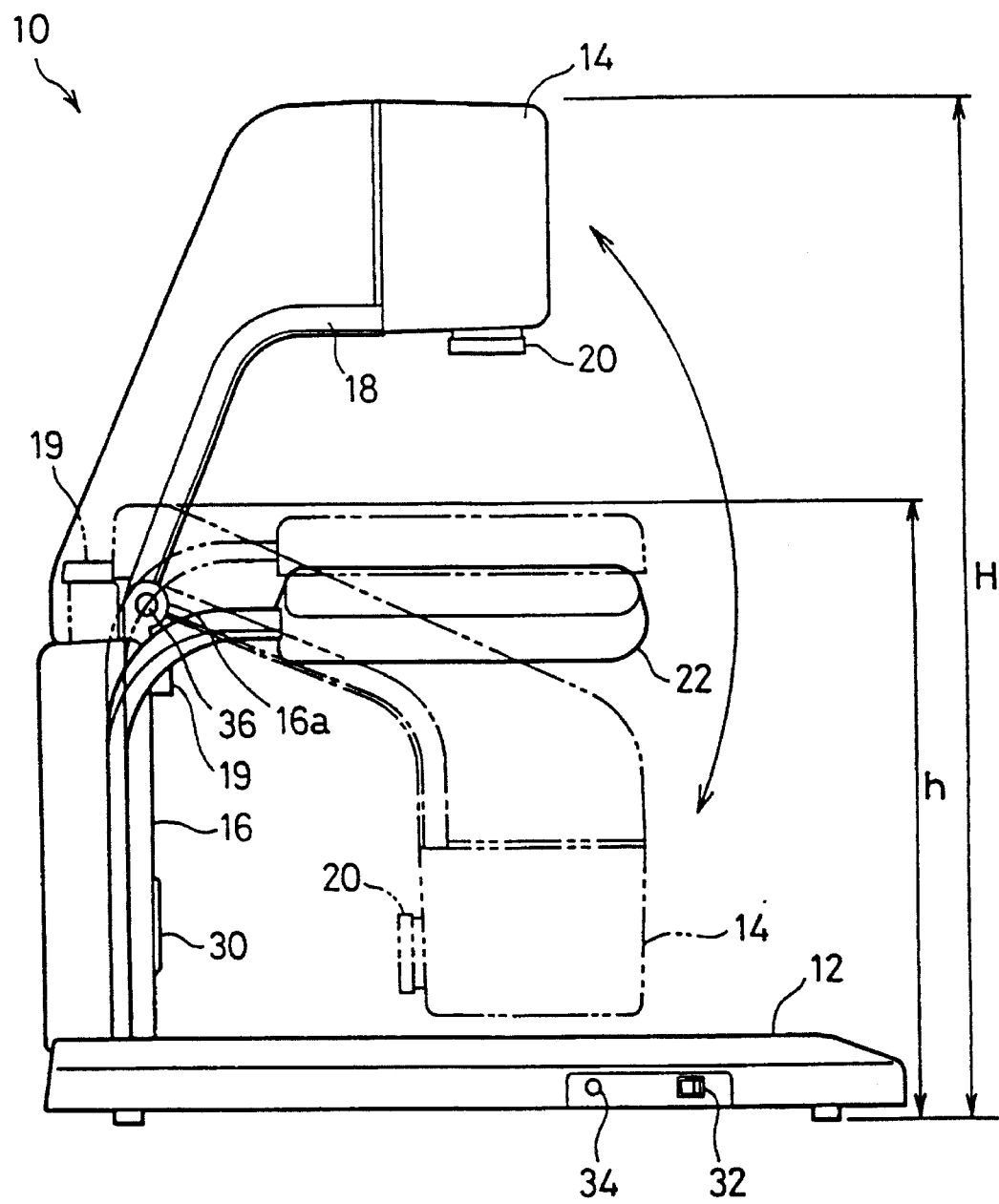
FIG. 5 is a side view showing the camera supporting arm member 18 and the camera head unit 14 under a service condition and a non-service condition of the presentation supporting system 10.

FIG. 3 is a decomposed perspective view illustrating a connecting structure of the camera supporting base member 16 with the camera supporting arm member 18. In the drawing of FIG. 4, the solid lines show connection of the camera supporting arm member 18 with the camera supporting base member 16 under a service condition of the presentation supporting system 10 whereas the two-dotted chain lines show connection of the same under a non-service condition or resting condition of the presentation supporting system 10. FIG. 5 is a side view illustrating the camera supporting arm member 18 and the camera head unit 14 under the service condition and the non-service condition of the presentation supporting system 10.

As clearly seen in FIG. 3, a pair of shaft support members 16a are disposed separately on both ends of a top face of the camera supporting base member 16. Each shaft support member 16a has a shaft hole 16b in which an arm support pin 36 is fitted. The camera supporting base member 16 also has a first screw hole 16c formed on a front face thereof to have a diameter greater than a thread diameter of the fixation screw 19.

The camera supporting arm member 18 has, on a lower end thereof, a shaft member 18a having a width received between the pair of shaft support members 16a of the camera supporting base member 16. A fixation piece 38 having a tapped hole 37 for receiving a threaded portion of the fixation screw 19 is projected downward from the shaft member 18a. The shaft member 18a has a pair of circular pin receiving elements 40 disposed on both ends of the shaft member 18a, and a pair of pin holding projections 41 extending backward from the pin receiving ring elements 40. In each pin receiving element 40 disposed on either side of the shaft member 18a, a bush hole 40a for receiving a resin flange bush 42 and a spot face 40b for receiving a flange 42a of the bush 42 are disposed concentrically. The spot face 40b has a depth greater than a thickness of the flange 42a of the bush 42. When the bush 42 is fitted into the bush hole 40a, the flange 42a of the bush 42 does not protrude from an end face of the pin receiving element 40 but is sufficiently received in the pin receiving element 40. Each bush 42 has a through hole 42c in which the arm support pin 36 is fitted.

The pin receiving element 40 and the pin holding projection 41 have a first common slit 40c formed with a metal saw while the bush 42 has a second slit 42b formed in an axial direction. The pair of bushes 42 are inserted in and fixed to the both ends of the shaft member 18a in the following manner. First, each bush 42 is fitted into the bush hole 40a of the pin receiving element 40 in such a manner that the first common slit 40c and the second slit 42b overlap each other. A hexagon socket head cap bolt 43 is then inserted in a drill hole 41a formed in each pin holding projection 41 via a plain washer 44 and clamped with a hexagon nut (not shown). By adjusting the clamping force of the hexagon socket head cap bolts 43, a distance between the first common slit 40c of the pin receiving element 40 and the pin holding projection 41 and the second slit 42b of the bush 42. Adjustment of the slit distance with the hexagon socket head cap bolts 43 will be described later.

A bracket 45 for fixing the camera supporting arm member 18 with the camera head-unit 14 mounted thereon under a non-service condition of the presentation supporting system 10 is securely attached to the camera supporting base member 16. The bracket 45 includes a top plate 45b having a second screw hole 45a formed therein to have a diameter identical with that of the first screw hole 16c formed on the front face of the camera supporting base member 16. Three sides of the top plate 45b are surrounded by two side plates 45c and a rear plate 45d. A first fixing projection 45e functioning as an attachment to the camera holding base member 16 extends from each side plate 45c of the bracket 45. A second fixing projection 45f functioning as an attachment to a rear panel cover (not shown) of the camera supporting base member 16 extends from the rear plate 45d (see FIG. 4).

The bracket 45 is attached to the camera supporting base member 16 in the following manner. Hexagon socket head cap bolts 46 are inserted in apertures 45g respectively formed in the first fixing projections 45e of the side plates 45c and the second fixing projection 45f of the rear plate 45d via plane washers 47. The bracket is fixed to the camera supporting base member 16 by clamping the hexagon socket head cap bolts 46 in tapped holes formed in the camera supporting base member 16 and the rear panel cover.

Attachment of the camera supporting arm member 18 to the camera supporting base member 16 is described according to FIGS. 3 and 4. As seen in FIG. 3, the pair of bushes 42 are fitted into the bush holes 40a formed on both ends of the shaft member 18a of the camera supporting arm member 18 in such a manner that the first common slit 40c of the pin receiving element 40 and the pin holding projection 41 and the second slit 42b of the bush overlap with each other. The hexagon socket head cap bolt 43 is inserted into the drill hole 41a of each pin holding projection 41 and tentatively clamped with the hexagon nut.

The shaft member 18a with the bushes 42 fitted in the both ends thereof is held between the shaft support members 16a of the camera supporting base member 16. The arm support pin 36 is inserted into the first shaft hole 16b of the first shaft support member 16a and pressed into the second shaft hole 16b of the second shaft support member 16a. The arm support pin 36 thereby goes through the first shaft hole 16b, the through holes 42c of the bushes 42 mounted on both ends of the shaft member 18a, and the second shaft hole 16b and is held in the first and second shaft holes 16b, 16b of the first and second shaft support members 16a, 16a. The arm support pin 36 is fixed to the first and second shaft support members 16a, 16a on its smaller-diametral portions by clamping hexagon socket head cap setscrews 48 into tapped holes (not shown) formed on the first and second shaft support members 16a, 16a. The camera supporting arm member 18 is accordingly coupled with the camera supporting base member 16 to be pivotably movable around the arm support pin 36.

The clamping force of the bushes 42 fitted in the pin receiving elements 40 of the shaft member 18a with respect to the arm support pin 36 is controlled by adjusting the hexagon socket head cap bolts 43 inserted in the pin holding projections 41. As described above, the distance between the first common slit 40c of the pin receiving element 40 and the pin holding projection 41 and the second slit 42b of the bush 42 is adjusted by varying the clamping force of the hexagon socket head cap bolt 43. When the clamping force of the hexagon socket head cap bolt 43 increases, the distance between the first slit 40c and the second slit 42b is shortened, so that the arm support pin 36 is clamped securely with the resin bushes 42.

When the camera supporting arm member 18 is joined with the camera supporting base member 16 as described above, the clamping force of the hexagon socket head cap bolts 43 is adjusted to prevent the camera supporting arm member 18 from undesirably rotating due to dead weight of the camera head unit 14. In other words, the camera supporting arm member 18 can be pivotally moved around the arm support pin 36 with respect to the camera supporting base member 16 to be folded down only by manually pressing the camera head unit 14. When the operator holds and lifts up the camera head unit 14, the camera supporting arm member 18 is reversely rotated to move from the folded position to a normal working position.

The camera supporting arm member 18 is folded and unfolded respectively in a non-service condition and a service condition of the presentation supporting system 10. As shown in FIG. 1, when the presentation supporting system 10 is under the service condition, the camera supporting arm member 18 is stretched to the working position on the camera supporting base member 16. In this state, the fixation screw 19 is inserted through the first screw hole 16c of the camera supporting base member 16 to be clamped in the tapped hole 37 formed in the fixation piece 38 of the camera supporting arm member 18 as shown by the solid lines in FIG. 4. The camera supporting arm member 18 is fixed to the camera supporting base member 16 in a selected orientation shown by the solid lines in FIG. 4 and FIG. 5 in order to direct the lens of the video camera 20 built in the camera head unit 14 to a shooting position on the table 12.

Under a non-service condition of the presentation supporting system 10, the camera supporting arm member 18 is folded according to the following process. First, the fixation screw 19 clamped in the tapped hole 37 is loosened and released. Second, the camera supporting arm member 18 is rotated around the arm support pin 36 towards the table 12 by manually pressing down the camera head unit 14. More particularly, the camera supporting arm member 18 is pivotally moved until a rear face of the fixation piece 38 of the camera supporting arm member 18 is brought into contact with a bottom face of the top plate 45b of the bracket 45 as shown by the two-dotted chain lines in FIG. 4. The fixation bolt 19 is then inserted into the second screw hole 45a of the top plate 45b to be clamped in the tapped hole 37 of the fixation piece 38.

As shown by the two-dotted chain lines in FIG. 5, the camera supporting arm member 18 is rotated around the arm support pin 36 with respect to the camera supporting base member 16 to be folded down until the camera head unit 14 sufficiently approaches the top face of the table 12. The camera supporting arm member 18 is fixed at this resting position with the fixation screw 19.

A height h of the presentation supporting system 10 under the non-service condition that the camera supporting arm member 18 is pivotally moved and folded down is 380 mm, which is approximately half the height H (740 mm) of the presentation supporting system 10 under the service condition that the camera supporting arm member 18 is stretched to the working position.

Figure 6:
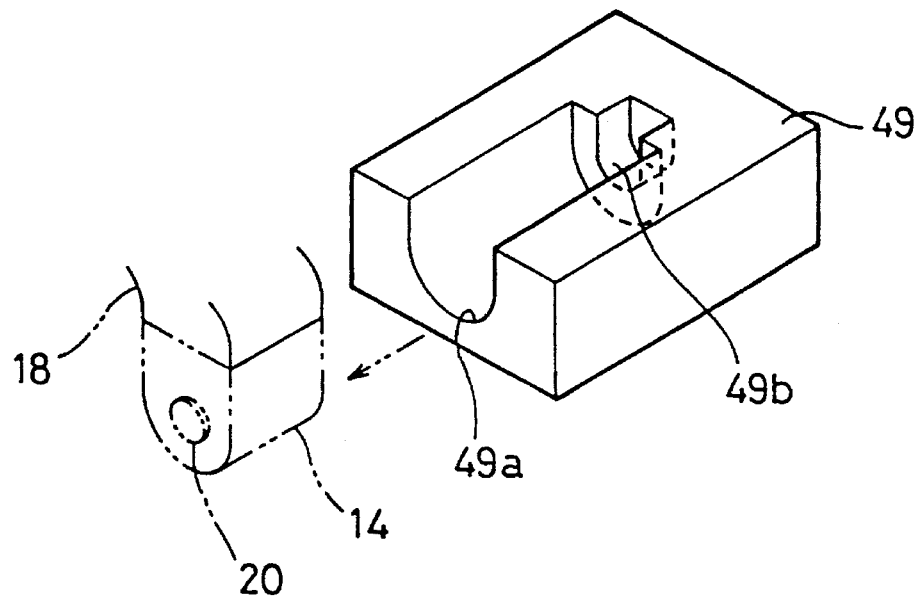
FIG. 6 is a perspective view showing a cushioning member 49 used in a non-service condition of the presentation supporting system 10.
Figure 7:
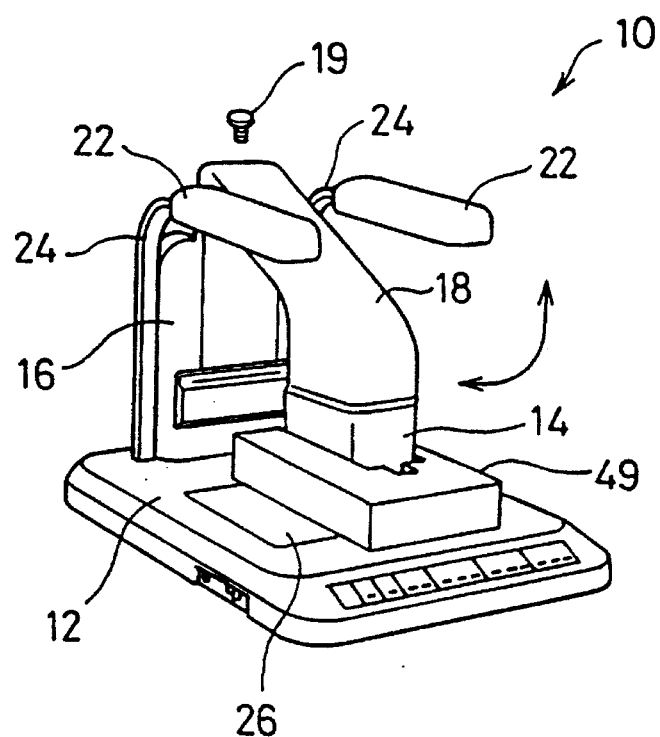
FIG. 7 is a perspective view illustrating the presentation supporting system 10 with the camera supporting arm member 18 folded and held with the cushioning member 49 for protecting a video camera 20.

A cushioning member 49 composed of a foamed material shown in FIG. 6 is used in the non-service condition of the presentation supporting system 10 where the camera supporting arm member 18 is folded. The cushioning member 49 includes a first recess 49a having a predetermined shape corresponding to the contour of the camera-head unit 14 to receive the camera head unit 14 therein. The cushioning member 49 has a second recess 49b for receiving the video camera 20 while the first recess 49a receives the camera head unit 14. The cushioning member 49 is attached from a direction shown by the arrow of FIG. 6 or from an opposite direction to receive the camera head unit 14 in the first recess 49a. As shown in FIG. 7, the cushioning member 49 receiving the camera head unit 14 is interposed between the camera head unit 14 and the table 12, for example, in packing the presentation supporting system 10. When the camera head unit 14 is received in the first recess 49a of the cushioning member 49 from the direction opposite to that shown by the arrow of FIG. 6, the video camera 20 is received in the second recess 49b. Under the non-service condition of the presentation supporting system 10, the auxiliary lighting units 22 are pivotally moved to be located adjacent to the camera supporting base member 16 via the holding arms 24 as typically seen in FIG. 7.

As described above, in the presentation supporting system 10 of the embodiment, the video camera 20 is held at a predetermined camera position above the table in such a manner that the camera supporting arm member 18 with the video camera 20 mounted thereon via the camera head unit 14 is pivotally movable around the arm support pin 36 with respect to the camera supporting base member 16 uprightly fixed to the table 12. Under the non-service condition of the presentation supporting system 10, the camera supporting arm member 18 is rotated around the arm support pin 36 to be folded towards the table 12, and the video camera 20 is moved from the predetermined camera position to the resting position sufficiently close to and directly above the table 12.

The height of the presentation supporting system 10 is desirably lowered by rotating and folding the camera supporting arm member 18 towards the table 12. The presentation supporting system 10 of the embodiment can accordingly be packed or stored in a space-saving, compact manner under a non-service condition. The space required for packing the presentation supporting system 10 is approximately two thirds of the same required for a conventional presentation supporting system. This desirably saves packaging materials use in shipment and reduces labor required for packing and shipment. Since the video camera 20 is positioned directly above the table 12, a packaging box is not required to have a complicated shape as in a conventional presentation supporting system. The compact packaging of the presentation supporting system 10 in the simple shape of the box improves the packing efficiency in a container and reduces the shipment cost.

In the presentation supporting system 10 of the embodiment, the camera supporting arm member 18 is joined with the camera supporting base member 16 with an identical fixation screw 19 under both the service condition where the video camera 20 is located at the predetermined camera position above the table 12 or the non-service condition where the camera supporting arm member 18 is folded towards the table 12. This effectively prevents the fixation screw 19, which is essential for fixation of the camera supporting arm member 18, from being lost by accident.

Under the non-service condition of the presentation supporting system 10 where the camera supporting arm member 18 is folded down, the camera head unit 14 is received in the cushioning member 49 composed of a foamed material. The cushioning member 49 is interposed between the table 12 and the camera head unit 14 when the head unit 14 is moved to the resting position directly above the table 12 by folding the camera supporting arm member 18. The cushioning member 49 effectively protects the video camera 20 built in the camera head unit 14 from being damaged.

In the structure of the presentation supporting system 10 of the embodiment, the clamping force of the bushes 42 fitted in the pin receiving elements 40 of the shaft member 18a with respect to the arm support pin 36 is controlled by adjusting the hexagon socket head cap bolts 43 inserted in the pin holding projections 41. This effectively prevents the camera supporting arm member 18 from being undesirably rotated due to the dead weight of the camera head unit 14, and joins the camera supporting arm member 18 with the camera supporting base member 16 to allow favorable rotation. This structure that the camera supporting arm member 18 is pivotally moved only by manually pressing down or lifting up the camera head unit 14, effectively prevents the operator's hand from being accidentally caught between the camera head unit 14 and the table 12. This ensures safety in operation of the presentation supporting system 10.

Figure 8:
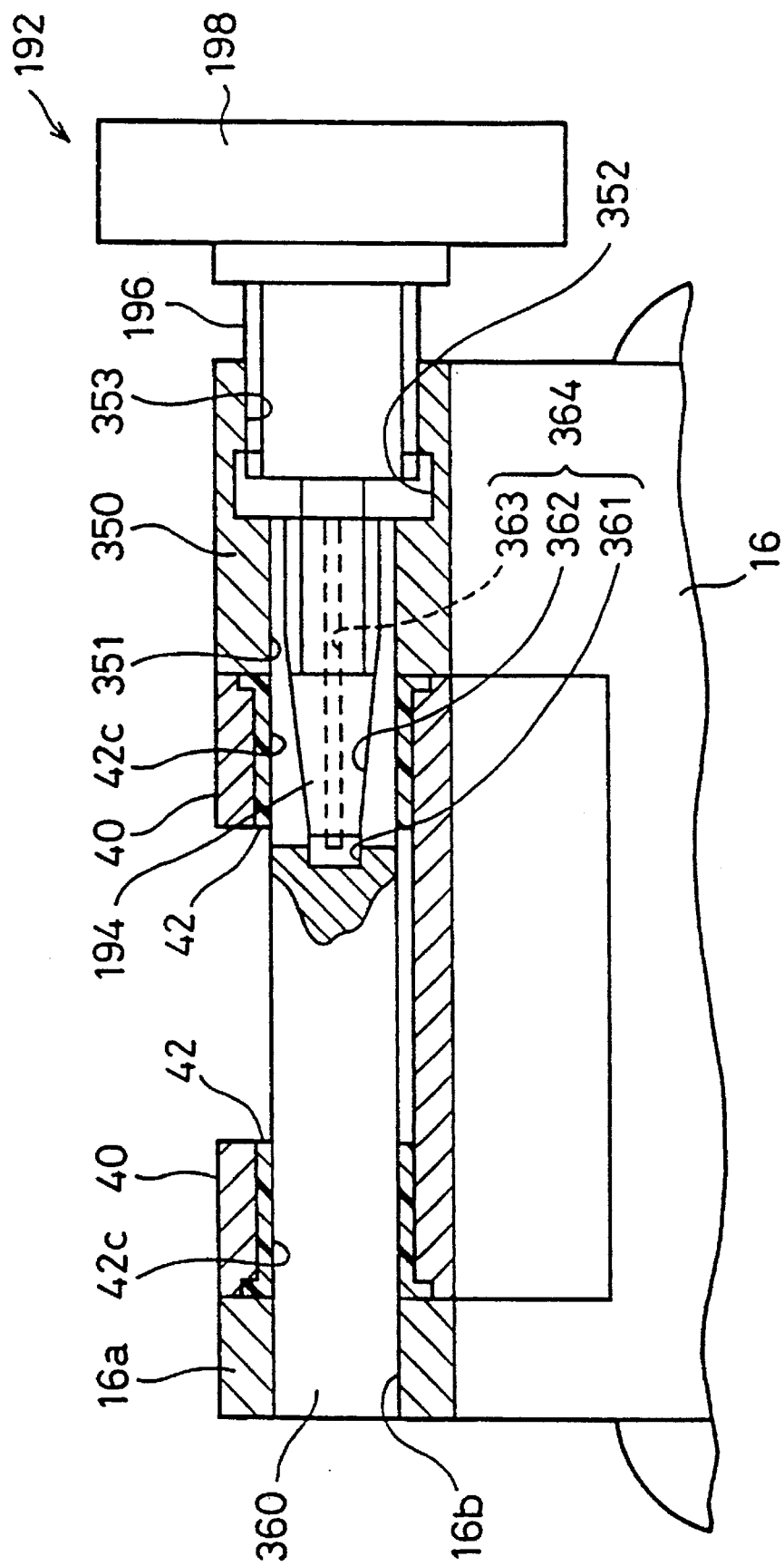
FIG. 8 is a cross sectional view showing a typical example of modification in the connecting structure of the camera supporting arm member 18 with the camera supporting base member 16.

The connecting structure of the camera supporting arm member 18 with the camera supporting base member 16 via the fixation screw 19 may be modified or altered according to various requirements. FIG. 8 shows a typical example of such modification. In this modified example, the second shaft support member 16a of the camera supporting base member 16, the arm support pin 36 for pivotally connecting the camera supporting arm member 18, and the fixation screw 19 for fixing the camera supporting arm member 18 have different structures that of the presentation supporting system 10 described above. The other elements including the pin receiving elements 40 and the pin holding projections 41 of the camera supporting arm member 18 have the identical structures and functions as those described above.

In the modified structure shown in FIG. 8, a second shaft support member 350 has a width greater than that of the first shaft support member 16a, and includes a shaft hole 351 for receiving an arm support pin 360, a relief hole 352 for machining a tapped hole, and a tapped hole 353 for receiving a fixation screw 192. The arm support pin 360 has a collet 364 including a relief hole 361 formed on one end thereof, a tapered hole 362, and a cross-shaped slit 363 formed by cutting the tapered hole 362. The fixation screw 192 has a tapered shaft 194 running through an inner face of the tapered hole 362 of the arm support pin 360 to spread the slit 363 of the collet 364, a threaded portion 196 fitted in the tapped hole 353, and a head portion 198.

In this structure, the camera supporting arm member 18 is attached to the camera supporting base member 16 in the following manner. The arm support pin 360 is inserted and fitted in the through holes 42c of the bushes 42, the first shaft hole 16b of the first shaft support member 16a, and the shaft hole 351 of the second shaft support member 350. The threaded portion 196 of the fixation screw 192 is clamped in the tapped hole 353 while the tapered shaft 194 is fitted into the tapered hole 362 of the collet 364 of the arm support pin 360. In this stage, the slit 363 of the collet 364 is not spread but maintains an outer diameter of the collet 364 identical with a general outer diameter of the arm support pin 360. The force of the bushes 42 fitted in the pin receiving element 41 for clamping the arm support pin 360 via the hexagon socket head cap bolts 43 (see FIG. 3) is adjusted to allow rotation of the camera supporting arm member 18 only through manual pressing or lifting.

The fixation screw 192 is then fastened to move the tapered shaft 194 forward along the inner face of the tapered hole 362 of the collet 364. The forward movement of the tapered shaft 194 spreads the slit 363 of the collet 364 to increase the force of the bushes 42 in the pin receiving element 40 for clamping the arm support pin 360. In this manner, the camera supporting arm member 18 is securely fixed to the camera supporting base member 16 via the collet 364. When pivotal rotation of the camera supporting arm 18 is required, the fixation screw 192 is loosened to move the tapered shaft 194 backward through the tapered hole 362 of the collet 364. The backward movement of the tapered shaft 194 returns the slit 363 to the original non-spread condition, and decreases the force of the bushes 42 in the pin receiving elements 40 for clamping the arm support pin 360 to the original adjustment via the hexagon socket head cap bolts 43. Fixation of the camera supporting arm member 18 via the collet 364 is thereby released.

In this modified structure, the camera supporting arm member 18 is fixed to the camera supporting base member 16 with the common fixation screw 192, which is not removed under any condition and thereby not lost by accident. The modified structure does not require the screw hole 16c of the camera supporting base member 16 or the bracket 45.

Another structure taking advantage of a ball-joint mechanism may also be applicable to fold the camera supporting arm member 18.

Figure 9:
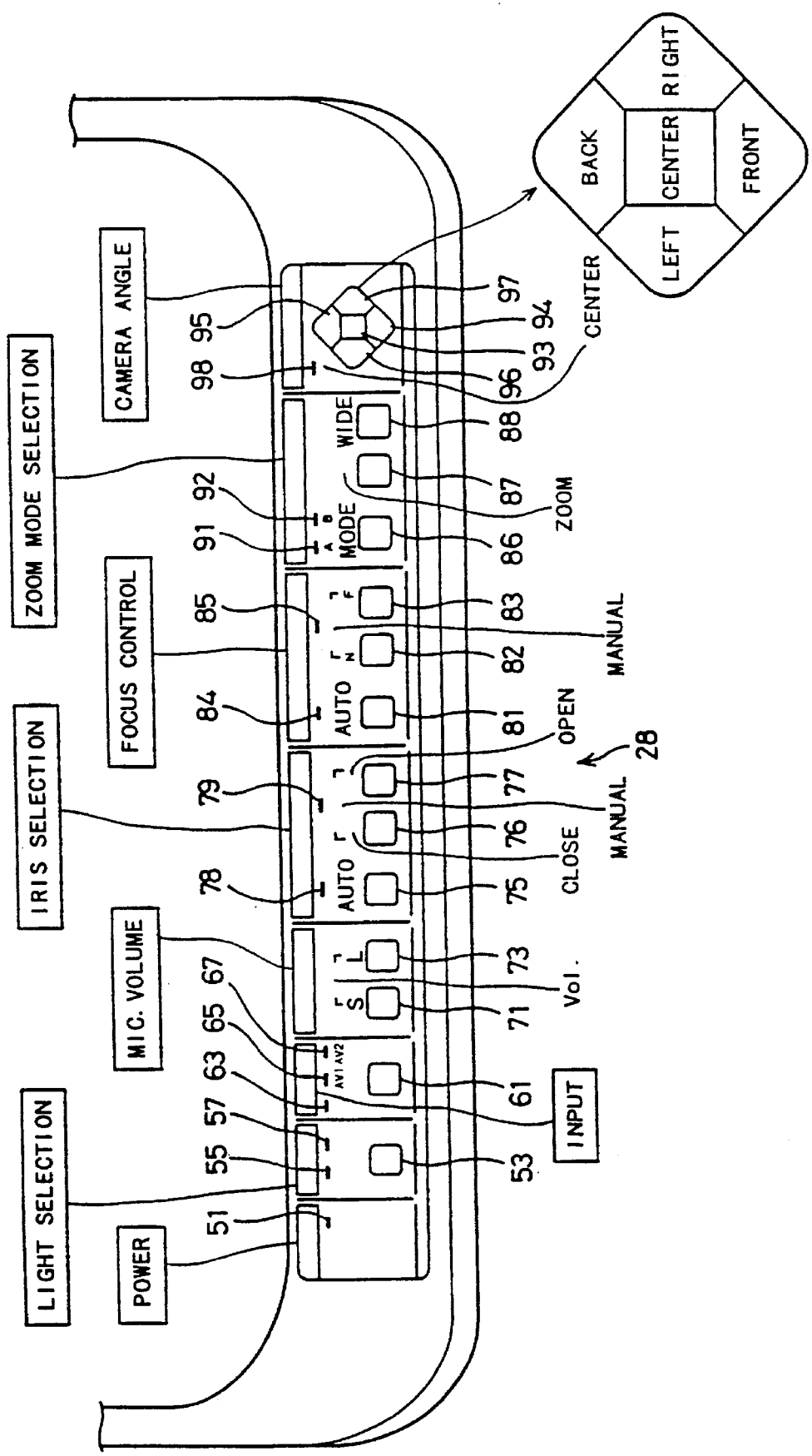
FIG. 9 is a plan view showing details of a front operation panel 28 of the presentation supporting system 10.

The front operation panel 28 of the presentation supporting system 10 is described in detail. The front operation panel 28 includes a number of control buttons and a number of LED (light emitting diode) indicators showing the settings of the control buttons. As clearly seen in FIG. 9, the front operation panel 28 is divided into a plurality of operational boxes; that is, 'Power', 'Lighting', 'Input Selection', 'Microphone', 'Iris', 'Focus', 'Zoom', and 'Camera'. The left-most box 'Power' has a power indicator 51 lit when the power switch 32 is turned ON.

The next box 'Lighting' includes a lighting selector 53 for choosing one light source between the auxiliary lighting units 22 and the transmitted light source built in the table 12 (hereinafter referred to as the base light unit), a first light indicator 55 which is lit when the base light unit is selected, and a second light indicator 57 lit when the auxiliary lighting units 22 are selected. The 'Input Selection' box includes an input selector 61, a first input indicator 63 which is lit when the main unit is selected for data input, a second input indicator 65 which is lit when a first auxiliary unit is selected, and a third input indicator 67 which is lit when a second auxiliary unit is selected. The input selector 61 is operated to choose one of three video signals, that is, one internal video signal sent from the video camera 20 built in the presentation supporting system 10 and two external video signals output from two auxiliary units to the presentation supporting system 10.

The 'Microphone' box has two control buttons for turning up and down the volume of a microphone connected to the microphone terminal 34 disposed adjacent to the power switch 32: a microphone volume down control 71 and a second microphone volume up control 73. The presentation supporting system 10 is provided with a built-in amplifier for amplifying audio signals from the microphone connected to the microphone terminal 34. The microphone volume in presentation with the presentation supporting system 10 is arbitrarily changed through control of the amplification in the amplifier.

The 'Iris' box includes an auto/manual iris selector 75 for setting either an automatic iris adjustment mode or a manual iris adjustment mode of the video camera 20, an iris out control 76 and an iris in control 77 both used under the manual iris adjustment conditions, an auto iris indicator 78 which is lit when the auto iris adjustment mode is set, and a manual iris indicator 79 which is lit when the manual iris adjustment mode is set. The brightness of a reproduction image corresponding to the subject matter on the table 12 is arbitrarily adjusted through operation of these control buttons 75, 76, and 77.

The 'Focus' box next to the 'Iris' box has an auto focus button 81 for setting an automatic focus adjustment mode of the video camera 20, a manual short focus control 82 for manually adjusting a focal position closer to the video camera 20, a manual long focus control 83 for manually adjusting the focal position distant from the video camera 20, an auto focus indicator 84 lit when the automatic focus adjustment mode is set, and a manual focus indicator 85 lit when a manual focus adjustment mode is set. The focal position with respect to the subject matter on the table 12 is arbitrarily adjusted through operation of these control buttons 81, 82, and 83. When the auto focus button 81 is pressed, a focus adjusting motor (not shown) disposed in the video camera 20 is driven for automatic adjustment of the focal position and then automatically stops to be in stand-by conditions after completion of the appropriate focus adjustment. This can effectively prevent unnecessary focus adjustment when the subject matter is moved slightly on the table 12 or an operator's hand moves across the video camera 20.

The 'Zoom' box includes a zoom mode selector 86 for selecting a zoom mode, a zoom up button 87 for zooming up the video camera 20 with respect to the subject matter, a wide zoom button 88 for adjusting the video camera 20 to a wide angle, a zoom mode A indicator 91 lit when the zoom mode is set on a mode A, and a zoom mode B indicator 92 lit when the zoom mode is set on a mode B.

The zoom modes A and B represent different zoom ranges set for the zoom lens of the video camera 20. The zoom lens of the video camera 20 has two zoom ranges set corresponding to lens combinations to realize a wide zoom angle. In the zoom mode A, a focal length f of the zoom lens in the video camera 20 ranges from 8.5 mm to 68 mm, and a shooting range is between 340×255 mm and 44.5×33.4 mm. In the zoom mode B, the focal length f ranges from 13 mm to 106 mm, and the shooting range is between 211×158 mm and 28×21 mm.

The right-most box of the front operation panel 28, the 'Camera' box has camera direction control buttons for adjusting the direction of the video camera 20: a camera direction center control 93 for setting the direction of the video camera 20 on a center of the table 12, a camera direction forward control 94 for directing the video camera 20 to a front portion of the table 12 (on the side of the front operation panel 28), a camera direction backward control 95 for directing the video camera 20 to a rear portion of the table 12, a camera direction leftward control 96 for directing the video camera 20 to a left portion of the table 12, and a camera direction rightward control 97 for directing the video camera 20 to a right portion of the table 12. The 'Camera' box also includes a camera direction center indicator 98 lit when the direction of the video camera 20 is set on the center of the table 12. The direction of the video camera 20 is arbitrarily set with respect to the subject matter placed on the table 12 through operation of the control buttons 94, 95, 96, and 97. When the camera direction center control 93 is pressed, a camera direction adjusting motor (not shown) is driven to forcibly direct the video camera 20 on the center of the table 12.

Figure 10:
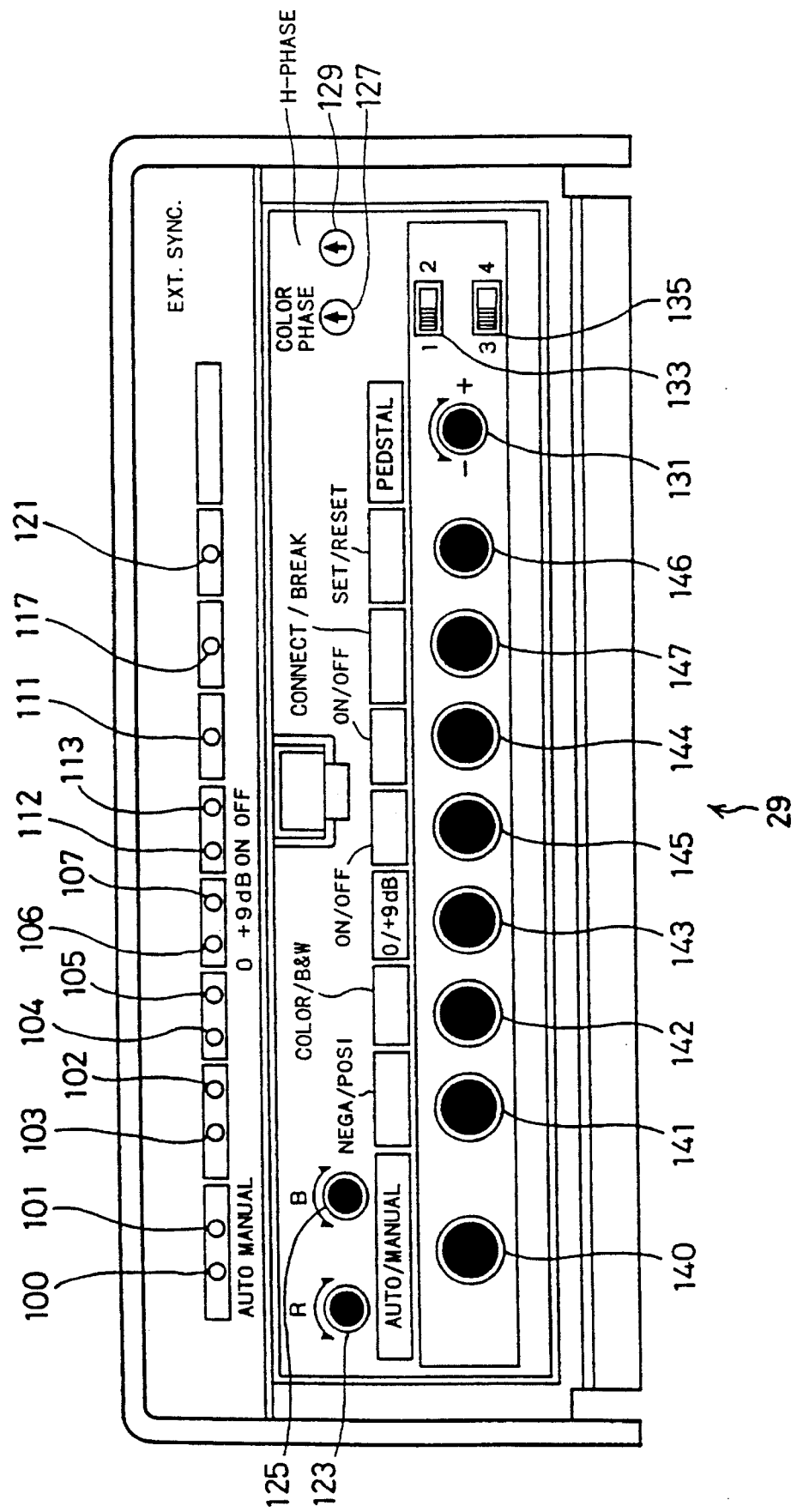
FIG. 10 is a front view showing details of a control panel 29 of the presentation supporting system 10.

Details of the control panel 29 are described according to FIG. 10. Although the control panel box 29 is generally closed with the front cover 30, a number of LED indicators representing the settings of control buttons in the control panel box 29 are disposed above the front cover 30, so that an operator can see the settings without opening the front cover 30.

The LED indicators on the control panel 29 include an auto white balance indicator 100 which is lit when an automatic white balance adjustment mode is selected, a manual white balance indicator 101 which is lit when a manual white balance adjustment mode is selected, a negative indicator 102 which is lit when a negative display mode is selected, a positive indicator 103 which is lit when a positive display mode is selected, a color indicator 104 which is lit when a color display mode is selected, and a B&W indicator 105 which is lit when a black and white display mode is selected. The control panel 29 is also provided with a gain 0 indicator 106 which is lit when a video gain is set at 0 dB, a gain 9 dB indicator 107 which is lit when the video gain is set at +9 dB, a detail stress-on indicator 112 which is lit when a detail stress for clearly showing characters or image contours on the subject matter is set ON, a detail stress-off indicator 113 which is lit when the detail stress is set OFF, a color bar indicator 111 which is lit while color bar video signals are output, a communication indicator 117 which is lit while the presentation supporting system 10 continues communication with an external control device, and a key set indicator 121 which is lit while settings of the various control buttons are stored.

The control panel 29 includes control knobs for directly changing circuit constants of a video/audio processing circuit (described later) and control buttons used for adjusting circuit constants of the video/audio processing circuit through a CPU of a control circuit (described later). A first color balance adjusting knob (red) 123 and a second color balance adjusting knob (blue) 125 disposed on an upper left corner of the control panel 29, a hue control volume 127 and a horizontal phase control volume 129 disposed on an upper right corner of the control panel 29, a pedestal control knob (for adjusting black in video images) 131, and hue control ON/OFF switches 133, 135 are directly connected to the video/audio processing circuit. One revolution of the hue control volume 127 changes the hue by 90 degrees, and combination of the hue control volume 127 with the hue control ON/OFF switches 133, 135 allows a hue adjustment of 360 degrees.

The control buttons arranged in alignment on a lower portion of the control panel 29 are read by the CPU of the control circuit and eventually used for control of the video control circuit. The control buttons include the following:

(1) a white balance mode selector 140 for setting either an automatic white balance adjustment mode or a manual white balance adjustment mode;

(2) a nega/posi selector 141 for setting either a negative display mode for showing a reproduction image of a negative film taken by the video camera 20 in negative or a positive display mode for showing the reproduction image in positive;

(3) a color/B&W selector 142 for choosing either a color display mode or a black and white display mode, for example, when a reproduction image of a typewritten print is displayed;

(4) a gain selector 143 for changing the gain of the video camera 20 between a standard 0 gain and a +9 dB gain for compensating for insufficient lighting;

(5) a detail stress on/off button 145 for setting either a stress on mode for showing contours of characters or a stress off mode;

(6) a color bar on/off button 144 for outputting a standard color bar in place of a visual image taken by the video camera in order to adjust a tone of an externally connected monitor;

(7) a communication on/off button 147 for choosing either a communication on mode in which the presentation supporting system 10 is controlled through RS-232C communication with an external control unit or personal computer or a communication off mode in which the presentation supporting system 10 is controlled through operation of control buttons and knobs on the front operation panel 28 and the control panel 29; and (8) a key set button 146 for storing a variety of settings in the presentation supporting system 10.

While the other control buttons are momentary, the key set button 146 is an alternative switch for mechanically storing a variety of data set by the operator. When the key set button 146 is pressed ON at a certain time point, a variety of conditions including selection of lighting, gain setting, and negative/positive conversion set in the presentation supporting system 10 at the certain time point are stored while the key set indicator 121 is lit to show that the settings are stored.

Figure 11:
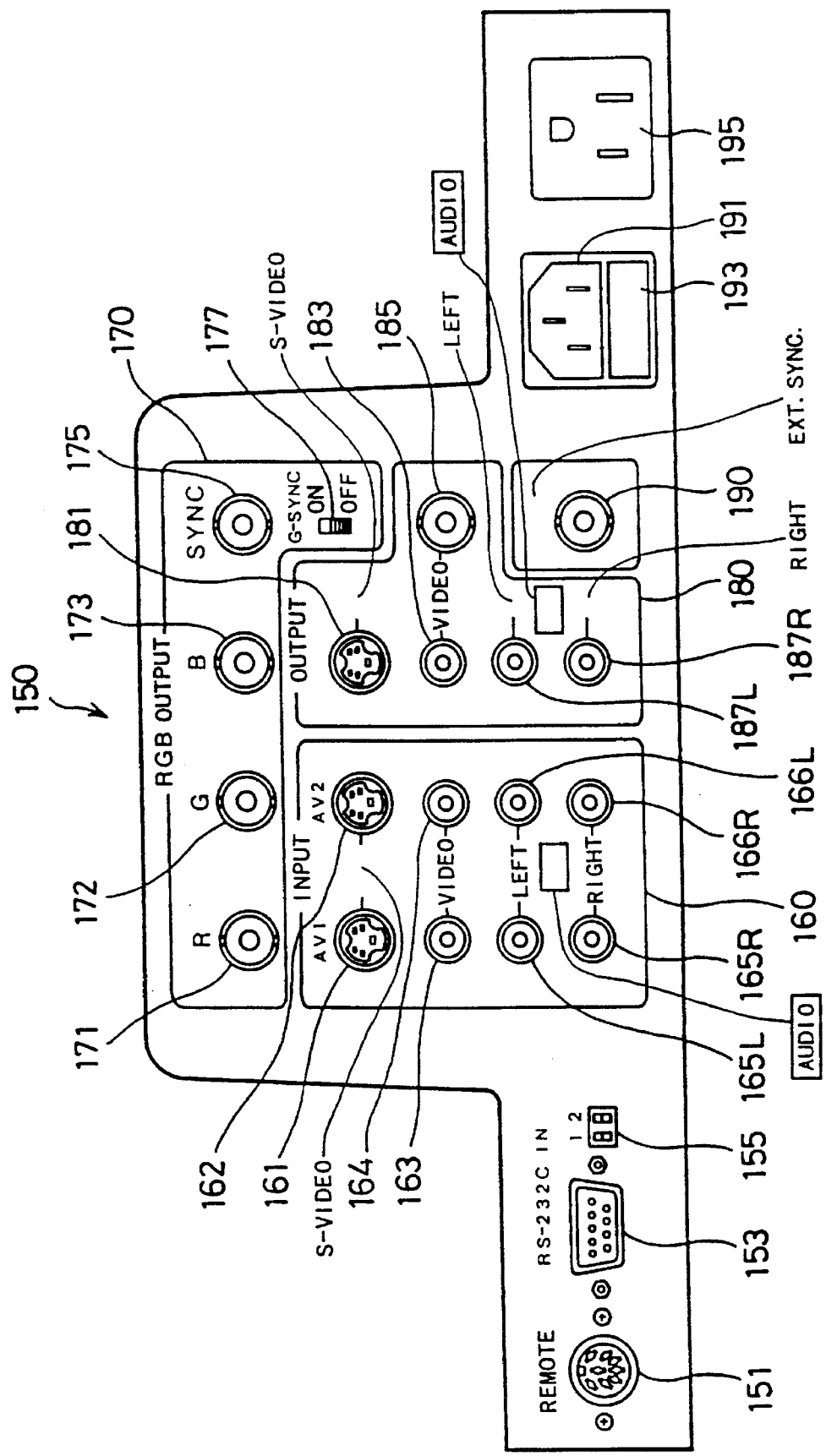
FIG. 11 is a rear view showing details of a rear panel 150 of the presentation supporting system 10.

A rear panel 150 mounted on a rear face of the camera supporting base member 16 of the presentation supporting system 10 is described according to FIG. 11. The rear panel 150 is used for connecting a variety of audio/visual devices to the presentation supporting system 10 as typically shown in FIG. 12. The rear panel 150 includes a remote terminal 151 for connecting with a remote control unit 152, an RS-232C communication terminal 153 for connecting with an RS-232C communicable unit such as a personal computer 154 or an external controller 400, a baud rate selection switch 155 for selecting a baud rate of communication out of four choices, an auxiliary input unit 160 for connecting with an external audio/visual device, an RGB output unit 170 for dividing video signals into R (red), G (green), and B (blue) components and outputting the RGB components, an output unit 180 for outputting standard video signals, an external synchronizing signal input terminal 190 for inputting external synchronizing signals, a power cord receptacle 191 for receiving a commercial alternating current cable, a fuse 193 for detecting an overload and automatically cutting the power off, and an outlet 197 for supplying the commercial alternating current to another device.

The auxiliary input unit 160 has a plurality of 2-channel input terminals: two S video-in terminals 161, 162 for inputting SVHS signals, two video-in terminals for inputting standard video signals, and two-channel audio-in terminals 165L, 165R, 166L, and 166R for inputting stereo sound. As typically shown in FIG. 12, these terminals of the auxiliary input unit 160 are connected to an SVHS video tape recorder (S-VTR) for outputting SVHS signals and audio signals, a standard video tape recorder (VTR) 202 for outputting standard video signals and audio signals, a 16-mm film projector 204 for outputting video signals, and a slide projector 206 for outputting video signals.

The RGB output unit 170 has a plurality of terminals for outputting high-quality RGB video images: an R output terminal 171, a G output terminal 172, a B output terminal 173, and an SYNC terminal 175 for outputting synchronizing signals. An SYNC (synchronizing signal) selection switch 177 disposed below the SYNC terminal 175 is turned ON when the presentation supporting system 10 is connected to an auxiliary system without an exclusive terminal for inputting synchronizing signals. These terminals of the RGB output unit 170 are connected to a video projector 210 and a large-screen monitor 212.

The output unit 180 has a plurality of terminals used for output of standard video signals: an S video-out terminal 181 for outputting SVHS video signals, a PIN type video-out terminal 183 for outputting standard video signals, a BNC type video-out terminal 185, 2-channel audio-out terminals 187L and 187R for outputting stereo sound. These terminals of the output unit 180 are connected to a standard video monitor 220 (or television having a video-in terminal), a liquid-crystal monitor 222, and a speaker 224 with a built-in amplifier.

Figure 12:
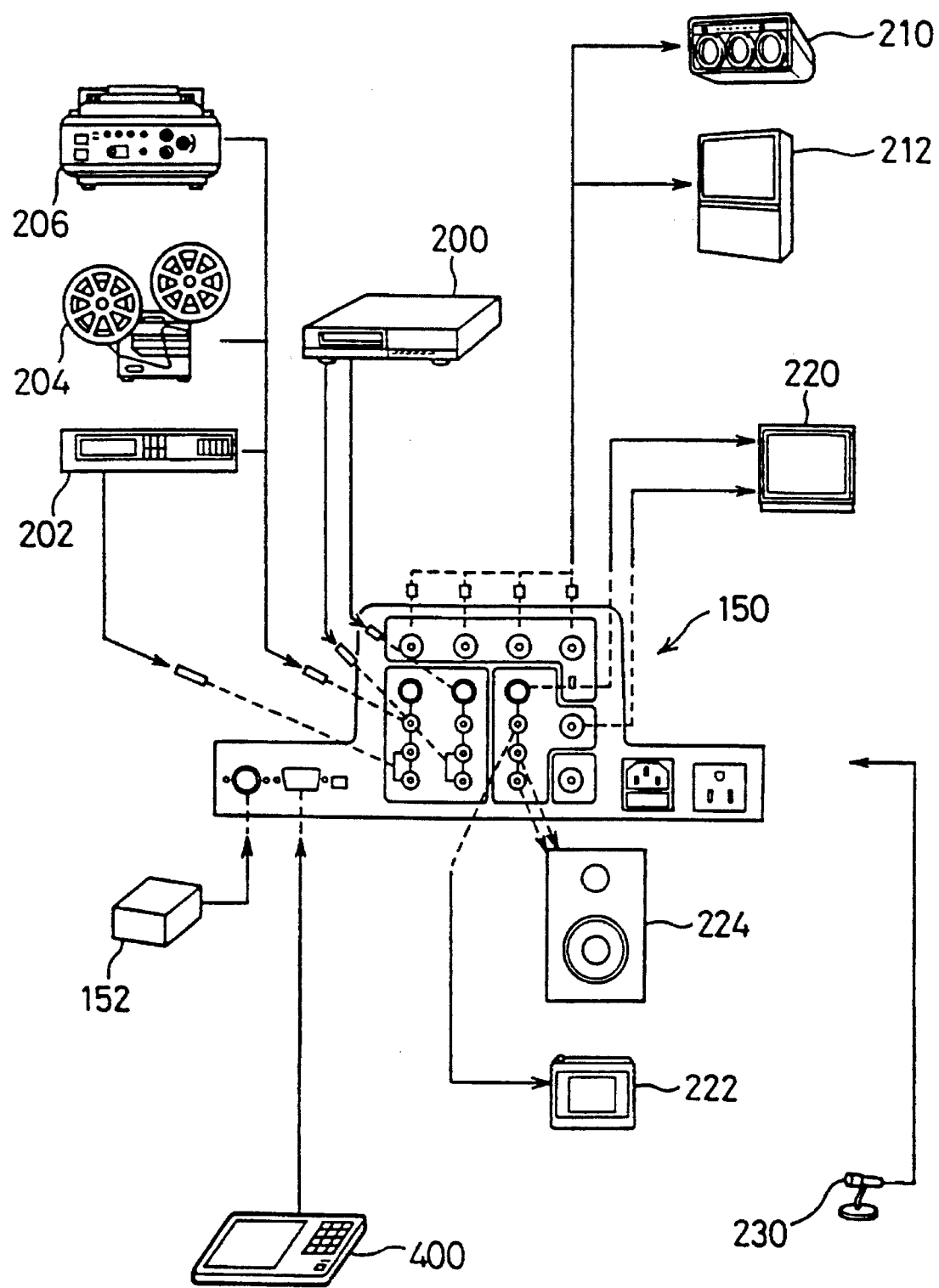
FIG. 12 shows a typical example of a system communication with the presentation supporting system 10.

A microphone 230 is connected to the microphone terminal 34 (not shown in FIG. 12).

Figure 13:
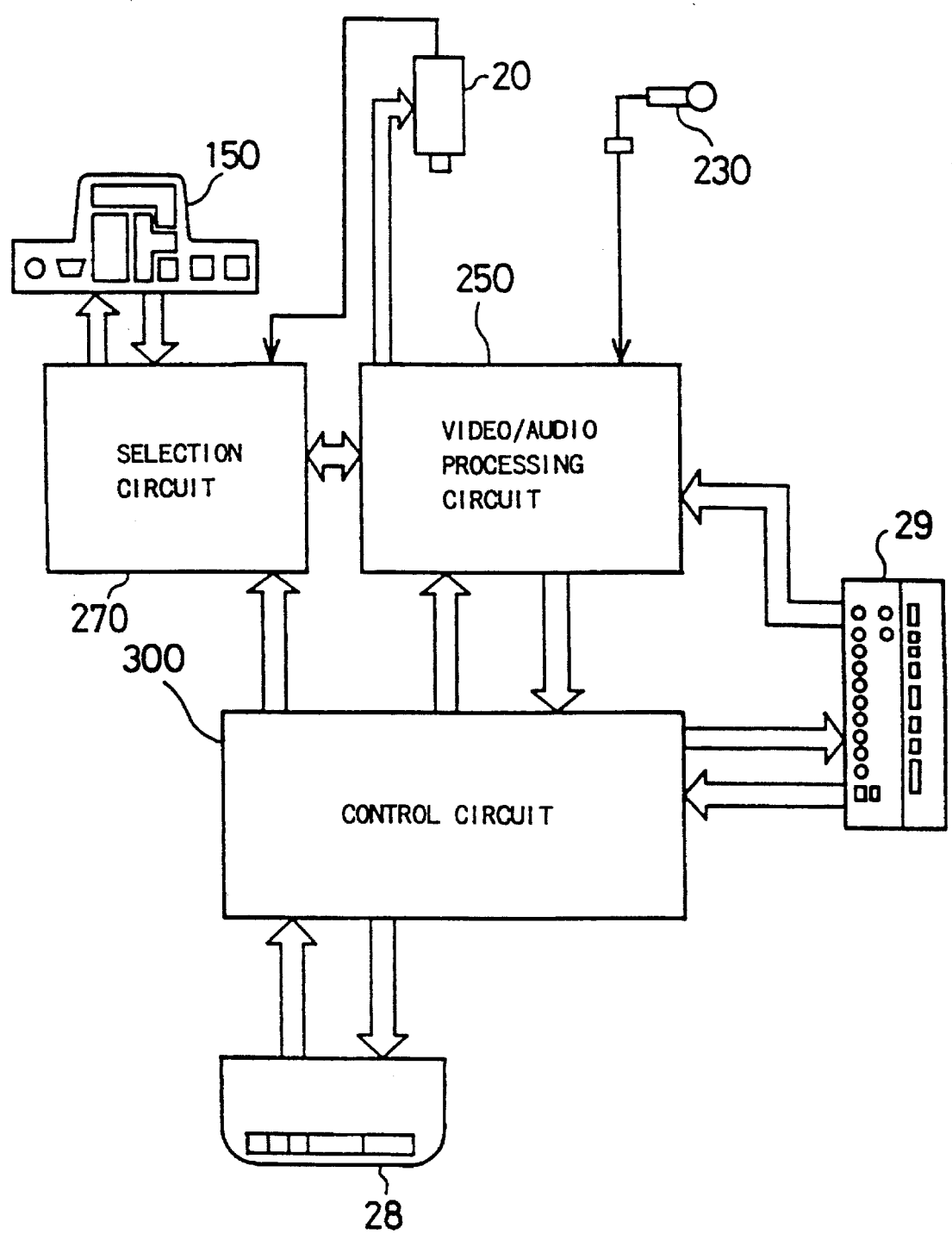
FIG. 13 is a block diagram schematically showing an electric structure of the presentation supporting system 10.

FIG. 13 is a block diagram schematically showing an electric structure of the presentation supporting system 10. As shown in FIG. 13, the presentation supporting system 10 includes a video/audio processing circuit 250 for executing required processes, for example, amplifying video signals sent from the video camera 20 and audio signals output from the microphone 230, and a control circuit 300 for receiving output from the front operation panel 28 and the control panel 29 and controlling the video camera 20 and the video/audio processing circuit 250.

As clearly seen in FIG. 13, all the control buttons on the front operation panel 28 and most controls on the control panel 29 are connected to the control circuit 300 while the control knobs on the control panel 29 including the hue control volume 127 as well as the video camera 20 and the microphone 230 are connected to the video/audio processing circuit 250. Input and output of video signals to and from the video/audio processing circuit 250 are connected to the rear panel 150 via a selection circuit 270.

The video/audio processing circuit 250 executes a variety of processes including negative/positive conversion and detail stress-on processing through addition of differential signals for video signals output from the video camera 20 as well as control of the amplification for audio signals output from the microphone 230. Details of a process to be executed are determined according to signals output from the control circuit 300. The zoom control, the iris control, and the camera direction control are also executed through the video/audio processing circuit 250. Detailed explanation of the video/audio processing circuit 250 is omitted since it is not an essential point of the present invention.

Figure 14:
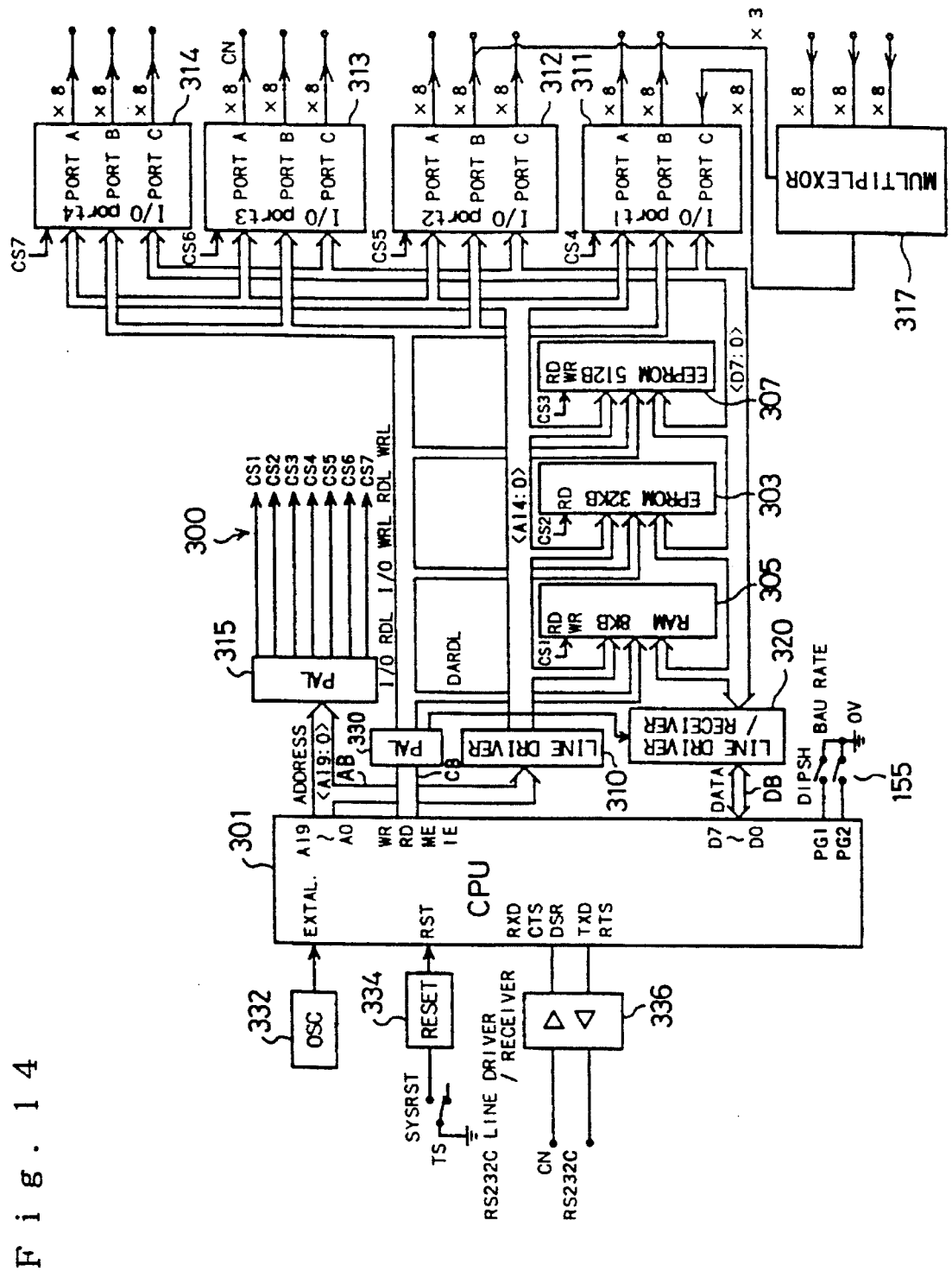
FIG. 14 is a block diagram illustrating an internal structure of a control circuit 300.

FIG. 14 is a block diagram illustrating an internal structure of the control circuit 300. As clearly seen in FIG. 14, the control circuit 300 includes a conventional CPU (central processing unit) 301 with a built-in serial communication function, a PROM (programmable read only memory) 303 for storing programs previously input, a RAM (random access memory) 305 for inputting and outputting data arbitrarily, and an EEPROM (electronic erasable, programmable ROM) 307 for storing electronic erasable and non-volatile data. An address bus AB of the CPU 301 is connected via a line driver 310 to the PROM 303, the RAM 305, first through fourth I/O ports 311, 312, 313, and 314 for input to and output from external devices, and a PAL (programmable array logic) 315 for address decoding. Each of the I/O ports 311, 312, 313, and 314 is composed of a chip having three 8-bit input/output ports set for either data input or output. A C port of the first I/O port 311 is connected to a multiplexer 317 for increasing a bit capacity of the I/O port 311. Control signals L0, L1, and L2 for the multiplexer 317 occupy 3 bits in a B port of the second I/O port 312. Allocation of functions to respective bits of these I/O ports will be described below.

A data bus DB of the CPU 301 is connected to a two-way line driver/receiver 320 to the PROM 303, the RAM 305, the EEPROM 307, and the first through the fourth I/O ports 311 through 314. A control bus CB of the CPU 301 is connected to the PAL 330, which outputs memory read/write signals and I/O read/write signals output from the CPU 301 to the PROM 303, the RAM 305, and the first I/O port 311.

The CPU 301 is also connected to an oscillation circuit 332 for generating a clock, a reset circuit 334 for generating a reset signal in response to a power supply, a line driver/receiver circuit 336 for RS-232C communication, and the baud rate selection switch 155 described above.

Figure 15:
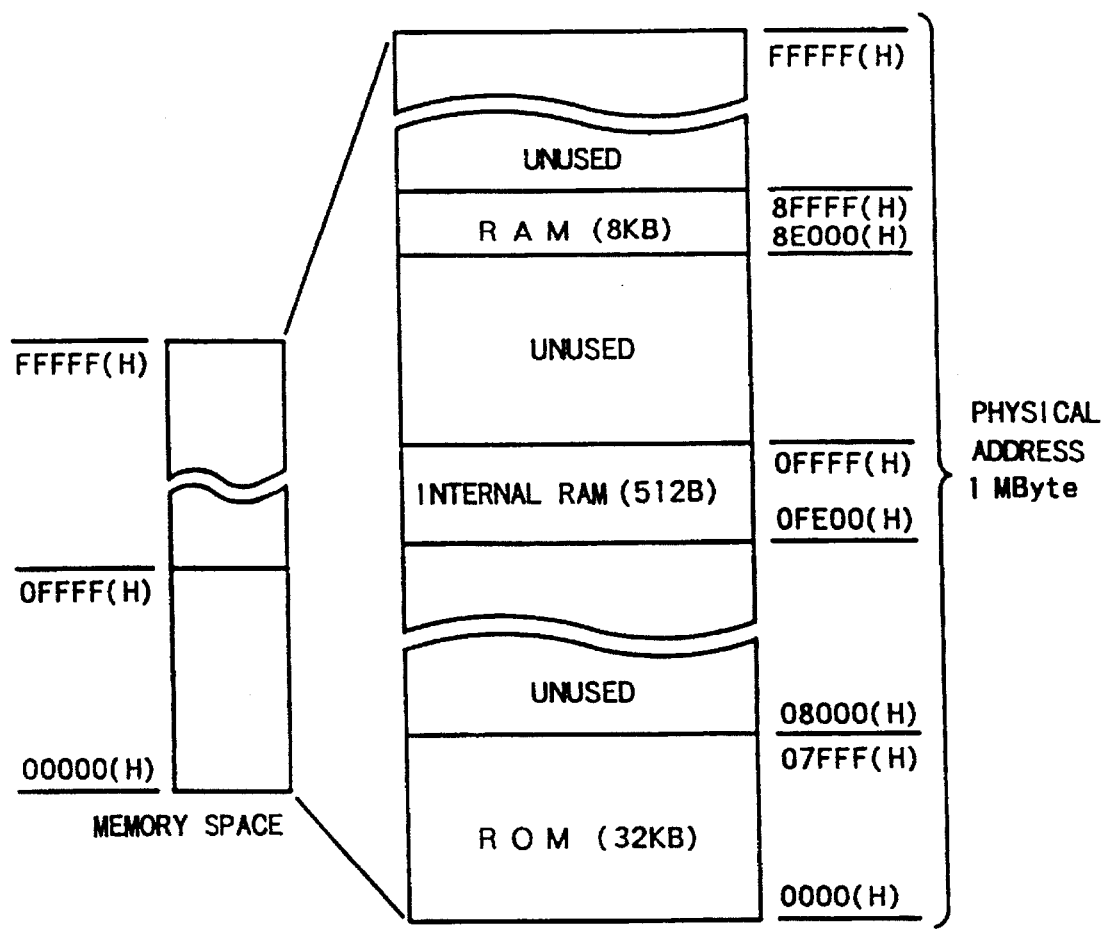
FIG. 15 shows a memory map of the control circuit 300.
Figure 16:
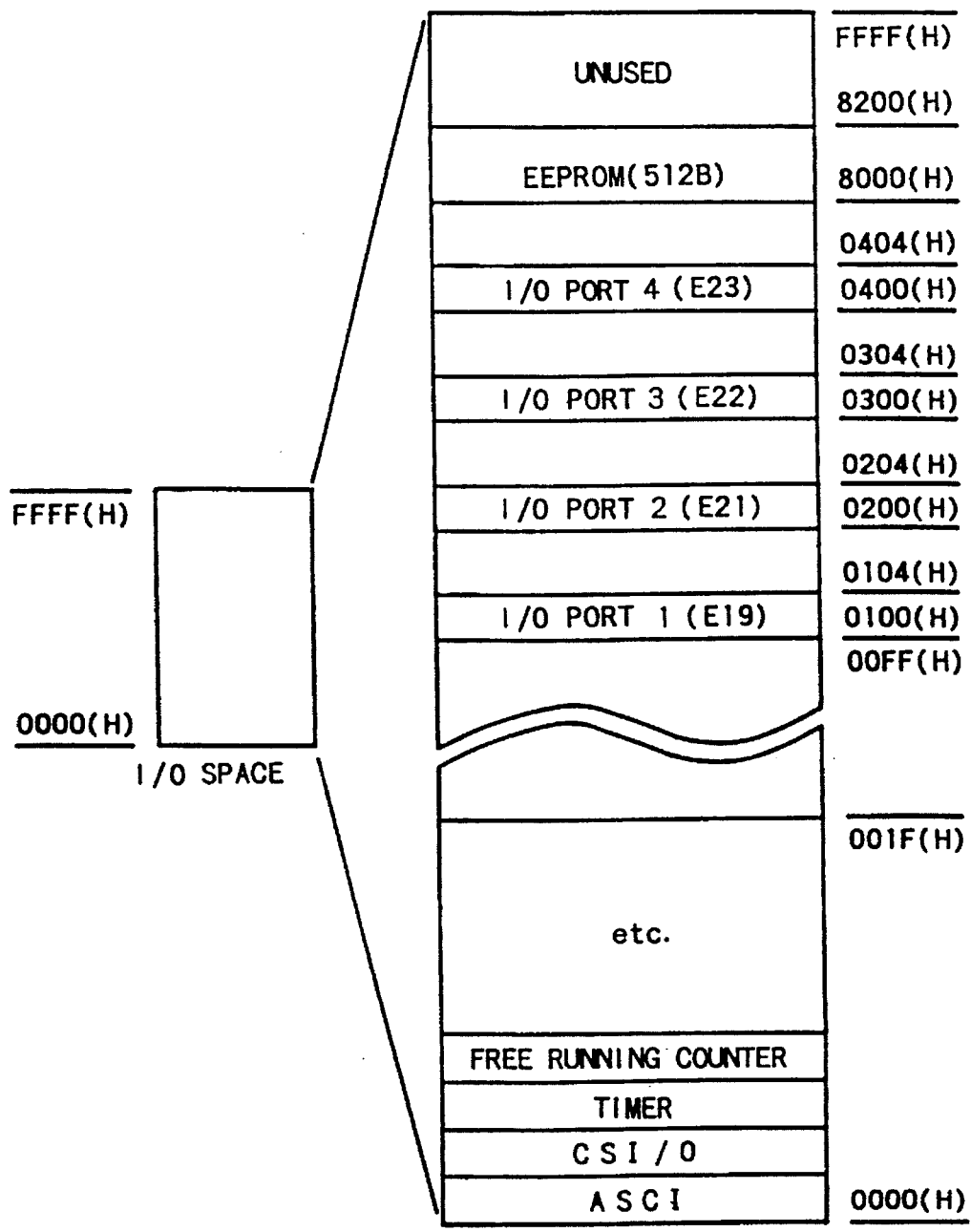
FIG. 16 shows an I/O map of the control circuit 300.

FIG. 15 shows a memory map of the control circuit 300, and FIG. 16 shows an I/O map thereof. Although the CPU 301 has a capacity of processing a maximum of 1 mega-byte physical addresses as a memory space, the PROM 303 actually installed in the embodiment occupies 32 kilo-byte including an address area from 0000(H) to 07FFF(H) for storing programs. An internal RAM (512 byte) of the CPU 301 is located in an address area starting from 0FE00(H) while the RAM (8 kilo-byte) 305 is installed in an address area starting from 8E000(H).

The CPU 301 also has a capacity of processing a maximum of 64 kilo-byte I/O space. As shown in FIG. 16, the EEPROM 307 actually installed in the I/O space occupies 512 byte starting from an address 8000(H). A condition of the baud rate selection switch 155 (port G), a condition of serial communication data CSI/O (port A), a built-in timer, a built-in free running counter, and the first through the fourth I/O ports 311, 312, 313, and 314 are also allocated to the I/O space. In the description below concerning with the first through the fourth I/O ports 311 through 314, I/O addresses may be simply referred to as addresses.

Each of the first through the fourth I/O ports 311 through 314 has three 8-bit input/output ports, each port having an independent I/O address. Head addresses of the first through the fourth I/O ports 311, 312, 313, and 314 are respectively 0100(H), 0200(H), 0300(H), and 0400(H). The three input/output ports of each I/O port 311, 312, 313, or 314 are respectively programmable to be set in either an input mode or an output mode. Through a start-up process (described later) executed immediately after a power supply, two ports at addresses of 0100(H) and 0101(H) are set for output whereas the last port at an address 0102(H) is set for input in the first I/O port 311. The total of six ports in the second I/O port 312 and the third I/O port 313 are all set for data input. In the forth I/O port 314, one port at an address of 0400(H) is set for input while the other two ports at addresses of 0401(H) and 0402(H) are set for output. The first through the fourth I/O ports 311 through 314 are connected to the front operation panel 28, the control panel 29, the video/audio processing circuit 250, and the selection circuit 270 via connectors (not shown).

FIGS. 17 through 21 are tables showing functions allocated to bits in each port. In the tables, a symbol 'N/C' represents that the bit is a spare bit not used currently. Functions of lighting the indicators on the front operation panel 28 are allocated to bits in the output ports at the addresses 0100(H) and 0101(H) of the first I/O port 311. The input port at the address 0102(H) is extended by the multiplexer 317, which selectively outputs operating conditions of 24 (=8 bits×3) control buttons to the input port of the first I/O port 311 according to the control signals L0, L1, and L2 assigned to bits 4 through 6 of the output port at an address of 0201(H) in the second I/O port 312. FIG. 18 shows a relationship between the control signals L0, L1, and L2 and input signals (expressed as the corresponding control buttons). As clearly seen in FIG. 18, 16 bits correspond to the control buttons on the front operation panel 28 whereas the other 8 bits correspond to the control buttons on the control panel 29.

In the second I/O port 312 having three output ports, 8 bits at the address 0200(H) and bits 1, 2, 3, and 7 of the address 0201(H) are used for lighting the indicators on the control panel 29 as shown in FIG. 19. The bits 4, 5, and 6 of the address 0201(H) of the second I/O port 312 are assigned to the control signals L0, L1, and L2 of the multiplexer 317 as described previously. The CPU 301 successively selects one of the control signals L0, L1, and L2 to read operating conditions of the control buttons on the front operation panel 28 and the control panel 29. The indicators are lit corresponding to the operating conditions read by the CPU 301.

For example, when the white balance mode selector 140 is set in the automatic white balance adjustment mode, the CPU 301 of the control circuit 300 reads the condition of the mode selector 140 via the multiplexer 317 and writes the value '1' into a bit 0 of the I/O address 0200(H) to light the auto white balance indicator 100. When the white balance mode selector 140 is set in the manual white balance adjustment mode, on the contrary, the CPU 301 writes the value '0' into the bit 0 of the address 0200(H) and the value '1' into a bit 1 to light the manual white balance indicator 101 in place of the auto white balance indicator 100. The other indicators are controlled by the CPU 301 in the same manner as above.

Bits 2 through 7 of the output port at an address 0202(H) of the second I/O port 312 are allocated to control outputs for the video/audio processing circuit 250. When these signals become active, the video/audio processing circuit 250 starts processing video signals output from the video camera 20. For example, when the CPU 301 write the value '1' into a bit 2 of the address 0202(H) of the second I/O port 312, the video/audio processing circuit 250 adds a differential signal to the video signal output from the video camera 20 at a predetermined ratio to output a stress-on signal for emphasizing details of a reproduction image.

Bits 0 through 7 at an address 0300(H) of the third I/O port 313 and bits 0 through 5 at an address 0301(H) are allocated to control signals for lighting and the video camera 20 as shown in FIG. 20. The CPU 301 writes specific data into these allocated bits to light the auxiliary lighting units 22 or the base light unit, adjust the zoom or focus of the video camera 20, turn the video camera 20 on or off, and adjust the iris of the video camera in a 6-bit range or 64 stages.

Bits 6 and 7 at an address 0301(H) of the third I/O port 313 are allocated to input selector signals B0 and B1 for the selection circuit 270. The CPU 301 selects video signals in cooperation with the selection circuit 270 through on/off control of the input selector signals B0 and B1. Bits 0 through 5 at an address 0302(H) of the third I/O port 313 are assigned to data B0 through B5 for setting the microphone volume. The CPU 301 writes selected data in these bits to vary the amplification of an amplifier built in the video/ audio processing circuit 250 in 64 stages (6 bits) so as to vary the volume of the microphone 230 input via the microphone terminal 34.

Bits 6 and 7 at the address 0302(H) of the third I/O port 313 are used for control outputs of the zoom mode. The CPU 301 exclusively writes data in these bits to change the zoom mode of the video camera 20 from A to B or vice versa.

Each port of the fourth I/O port 314 is set for directional control of the video camera 20 as shown in FIG. 21. Bits 1 through 5 at the address 0400(H) set as an input port are allocated to data representing operation of control buttons disposed on the right end of the front operation panel 28 for adjusting the direction of the video camera 20. Respective bits 2 through 7 of the output ports at the addresses 0401(H) and 0402(H) are assigned to data B0 through B5 for setting the front-rear direction of the video camera 20 and data B0 through B5 for setting the left-right direction of the video camera 20. The CPU 301 writes selected data in these bits to drive the camera direction adjusting motor to set the video camera 20 at an appropriate position selected out of 64 stages in both the front-rear direction and the left-right direction.

A bit 0 at the address 0401(H) is allocated to light the camera direction center indicator 98, and a bit 1 to a control signal for setting the front-rear direction of the video camera 20 on a center. When the bit 1 is set ON, the CPU 301 writes selected data into bits 2 through 7 of the address 0401(H) to drive the camera direction adjusting motor to set the front-rear direction of the video camera 20 on its center. A bit 1 at the address 0402(H) is, on the other hand, assigned to a control signal for setting the left-right direction of the video camera 20 on a center. When this bit 1 is set ON, the CPU 301 writes selected data into bits 2 through 7 of the address 0402(H) to drive the camera direction adjusting motor to set the left-right direction of the video camera 20 on its center. In actual operation, when the camera direction center control 93 is pressed, both the bit 1 of the address 0401(H) and the bit 1 of the address 0402(H) are set ON, and the CPU 301 writes selected data into the bits 2 through 7 of the address 0401(H) and the bits 2 through 7 of the address 0402(H) to set the direction of the video camera 20 on the center.

In the presentation supporting system 10 thus constructed, desired presentation conditions are set for the material placed on the table 12 through operation of the control buttons on the front operation panel 28 and the control panel 29. Image data signals representing the material are then output to a variety of devices connected to the RGB output unit 170 or the output unit 180 of the rear panel 150. Details of this procedure are not essential for the present invention and thereby omitted herein.

Figure 22:
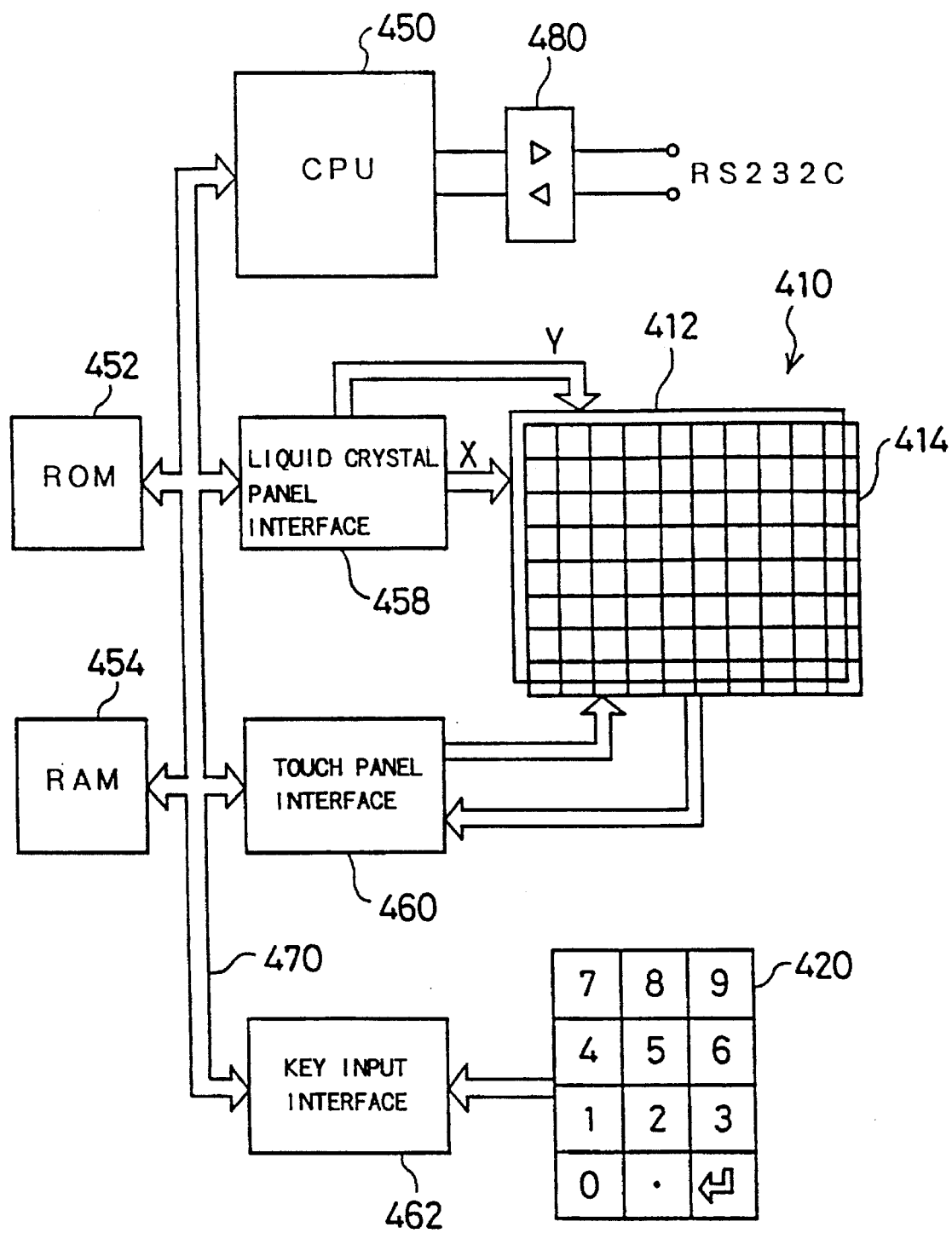
FIG. 22 is a block diagram schematically showing an electric structure of the external controller 400.

FIG. 22 is a block diagram schematically showing an electric structure of the external controller 400 connected to the communication terminal 153 of the rear panel 150 via the communication cable 402. As shown in FIG. 22, the external controller 400 includes a conventional CPU 450 with a built-in serial communication function, a ROM 452 for storing programs previously input, a RAM 454 used for reading and writing data, a liquid-crystal panel interface 458 for controlling a liquid crystal panel 412 of the screen 410, a touch panel interface 460 for controlling data input with a touch panel 414 of the screen 410, and a key input interface 462 for controlling data input with the ten-key pad 420. These elements of the external controller 400 are connected to one another via a bus 570.

A line driver/receiver circuit 480 for RS-232C communication is connected to the CPU 450. The external controller 400 receives and outputs data from and to the CPU 301 via the line driver/receiver 480 and the line driver/receiver circuit 336 of the presentation supporting system 10. The CPU 450 is also connected to an oscillation circuit (not shown) for generating a clock, a reset circuit (not shown) for generating a reset signal in response to a power supply.

Figure 23:
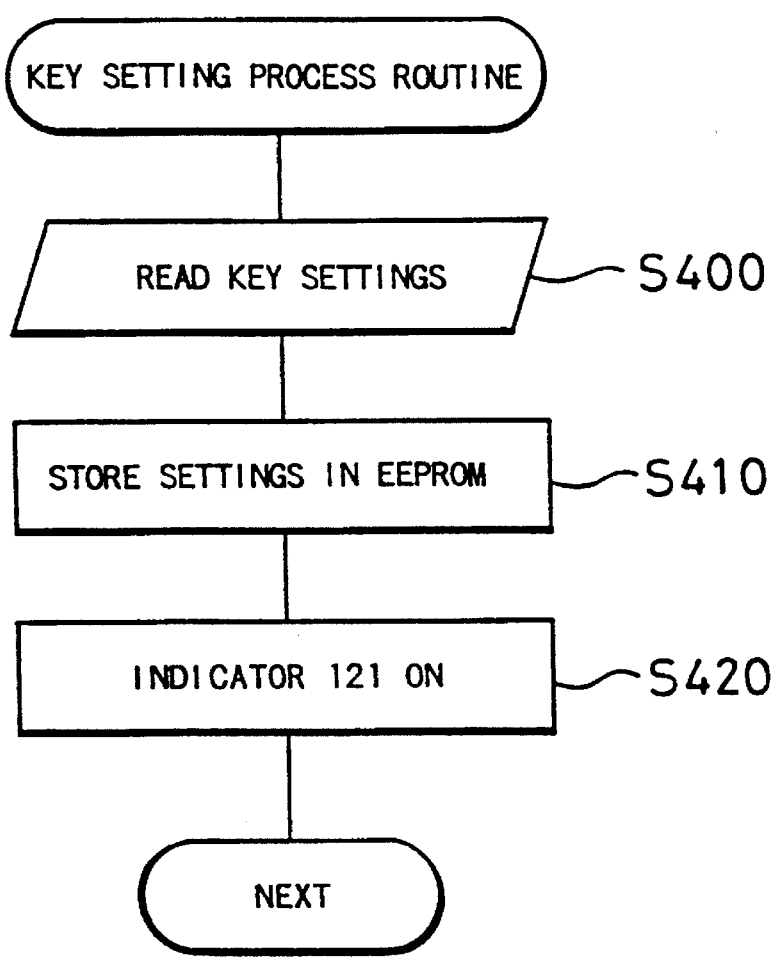
FIG. 23 is a flowchart showing a key setting process routine executed by the control circuit 300.
Figure 24:
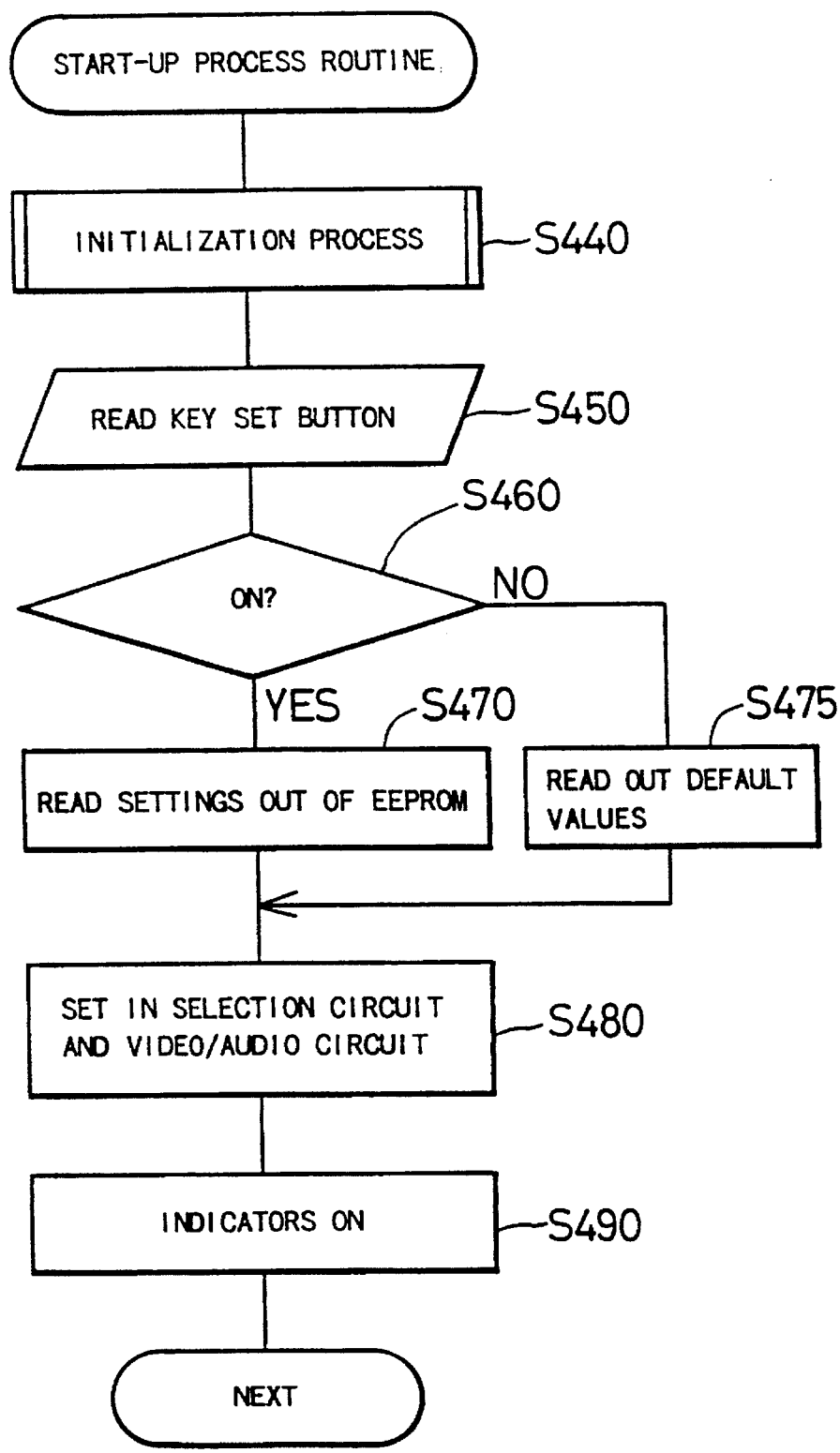
FIG. 24 is a flowchart showing a start-up process routine executed by the control circuit 300.

Processes essential for the present invention executed by the CPU 301 are described according to the flowcharts of FIGS. 23 and 24. FIG. 23 is a flowchart showing a key setting process routine when the key set button 146 is depressed, and FIG. 24 is a flowchart showing a start-up process routine executed on a power supply to the presentation supporting system 10.

As described previously, the key set button 146 is the only alternative switch on the control panel 29 to be set alternatively ON and OFF by each activation of the button 146. When the key set button 146 is pressed ON, the program enters the key setting process routine shown in FIG. 23. At step S400 the CPU 301 reads settings of the control buttons on the front operation panel 28 and the control panel 29. Since the setting of each control button is stored in a predetermined area of the RAM 305 every time when the control button is operated, the CPU 301 reads data representing the key settings out of the RAM 305.

At step S410, the CPU 301 stores the settings read at step S400 into a predetermined area of the EEPROM 307. Check sum data of these key settings is preferably written at a predetermined address of the EEPROM 307 together with each key setting. This enhances the reliability of the key set data. The program then enters step S420 at which the CPU 301 writes the value '1' into the bit 1 of the address 0100(H) of the first I/O port 311 to light the key set indicator 121. After execution of step S420, the program goes to 'NEXT' to exit from the routine.

In the routine of FIG. 23, data stored in the RAM 305 are concerned with selection of either the auxiliary lighting units 22 or the base light unit, selection of key input, the microphone volume, the iris opening, the zoom mode, selection of either the automatic white balance adjustment mode or the manual white balance adjustment mode, selection of either the color display mode or the black and white display mode, selection of the gain, output of the color bar, and on/off control of the detail stress. Although the structure of the embodiment can not store the exact zoom angle or focus since a DC motor without a function for detecting a driving amount is used for adjustment of the zoom and focus of the video camera 20, a stepping motor or an encoder for detecting a driving amount may be used in place of the DC motor to store the focus and zoom conditions.

When the power is supplied to the presentation supporting system 10, the program enters the start-up process routine shown in FIG. 24. At step S440, an initialization process is executed, which includes setting of the input and output ports in the I/O ports 311 through 313 and initialization of an internal register of the CPU 301.

At step S450, the CPU 301 directly reads the on/off condition of the alternative key set button 146. The program then proceeds to step S460 at which it is determined whether the key set button 146 is ON or OFF. When the key set button 146 is set ON, the program goes to step S470 at which the CPU 301 reads out data of the key settings stored in the predetermined area of the EEPROM 307. When the check sum data is stored together with key settings, the CPU 301 compares the check sum data with a total of actual key settings data to determine that the data stored in the predetermined area of the EEPROM 307 are correct.

When the key set button 146 is set OFF, on the other hand, the program proceeds to step S475 at which the CPU 301 reads out default values stored in the RAM 305. Under the OFF state of the key set button 146, conditions during the shipment should be selected. After execution of step S470 or S475, the program goes to step S480 at which data of the key settings or default values are set in the video/audio processing circuit 250 and the selection circuit 270. Through the start-up process routine, data of the key settings are reproduced on the presentation supporting system 10 when the key set button 146 is set ON whereas the default values set on the shipment are reproduced on the presentation supporting system 10 when the key set button 146 is set OFF.

The program then proceeds to step S490 at which the CPU 301 outputs selected data to the first through third I/O ports 311 through 313 so as to light the corresponding indicators. After execution of step S490, the program goes to 'NEXT' to exit from the routine.

As described above, in the presentation supporting system 10 of the embodiment, data representing a variety of settings including selection of either the auxiliary lighting units 22 or the base light unit, selection of input signals, and the microphone volume are stored in response to a press-ON of the key set button 146. Any specific settings or optimal settings through operation of the front operation panel 28 and the control panel 29 are recovered on every power supply. This structure allows the specific or optimal settings of the presentation supporting system 10 to be recovered without any trouble even when a plurality of operators use the presentation supporting system 10, thus significantly improving efficiency of presentation.

Since the key set indicator 121 is lit while the settings of the control buttons are stored in response to a press-ON of the key set button 146, the operator can easily check that the settings are stored. A group of settings once stored can be changed through operation of the control buttons on the front operation panel 28 and the control panel 29. A new group of settings after required change can be stored by pressing OFF the key set button 146 and again pressing ON the key set button 146. The key set indicator 121 lights up, goes out, and again lights up corresponding to operation of the key set button 146, and the operator can thus readily check the storing conditions of the key settings. In the structure of the embodiment, the settings of the control buttons are stored in the EEPROM 307. This allows the settings to be accurately reproduced even when the power is supplied to the presentation supporting system 10 after a relatively long interval.

The key set button 146 constructed as an alternative switch has the following advantages. When the key set button 146 is formed as a momentary switch, the operating condition of the key set button 146 should also be stored in the EEPROM 307. In such a case that the operating condition of the key set button 146 can not be renewed due to abnormality in the EEPROM 307, previous settings input prior to occurrence of the abnormality are undesirably reproduced on every power supply. On the other hand, under an abnormal condition of the EEPROM 307, the key set button 146 formed to be an alternative switch is pressed OFF to cancel the previous settings input prior to occurrence of the abnormality.

There may be many modifications and changes in the structure of the above embodiment without departing from the spirit of the present invention. Typical examples of such modification include a structure for storing key settings in a flash ROM or a battery back-up RAM in place of the EEPROM 307, a structure having a key set recovery button for changing the key settings to conditions previously stored as well as the key set button 146, a structure for storing the operating conditions of the control buttons on the front operation panel 28 and the control panel 29 into the EEPROM 307 on every operation of these control buttons, a structure for storing the key settings into the EEPROM 307 when the power is turned OFF, a structure having a larger capacity of the EEPROM 307 to store plural groups of key settings, and a structure including a device for reading and writing data from and into an external memory medium, for example, a magnetic card, to store the key settings into the external memory medium, which are recovered or changed in response to insertion of the external memory medium.

Figure 25:
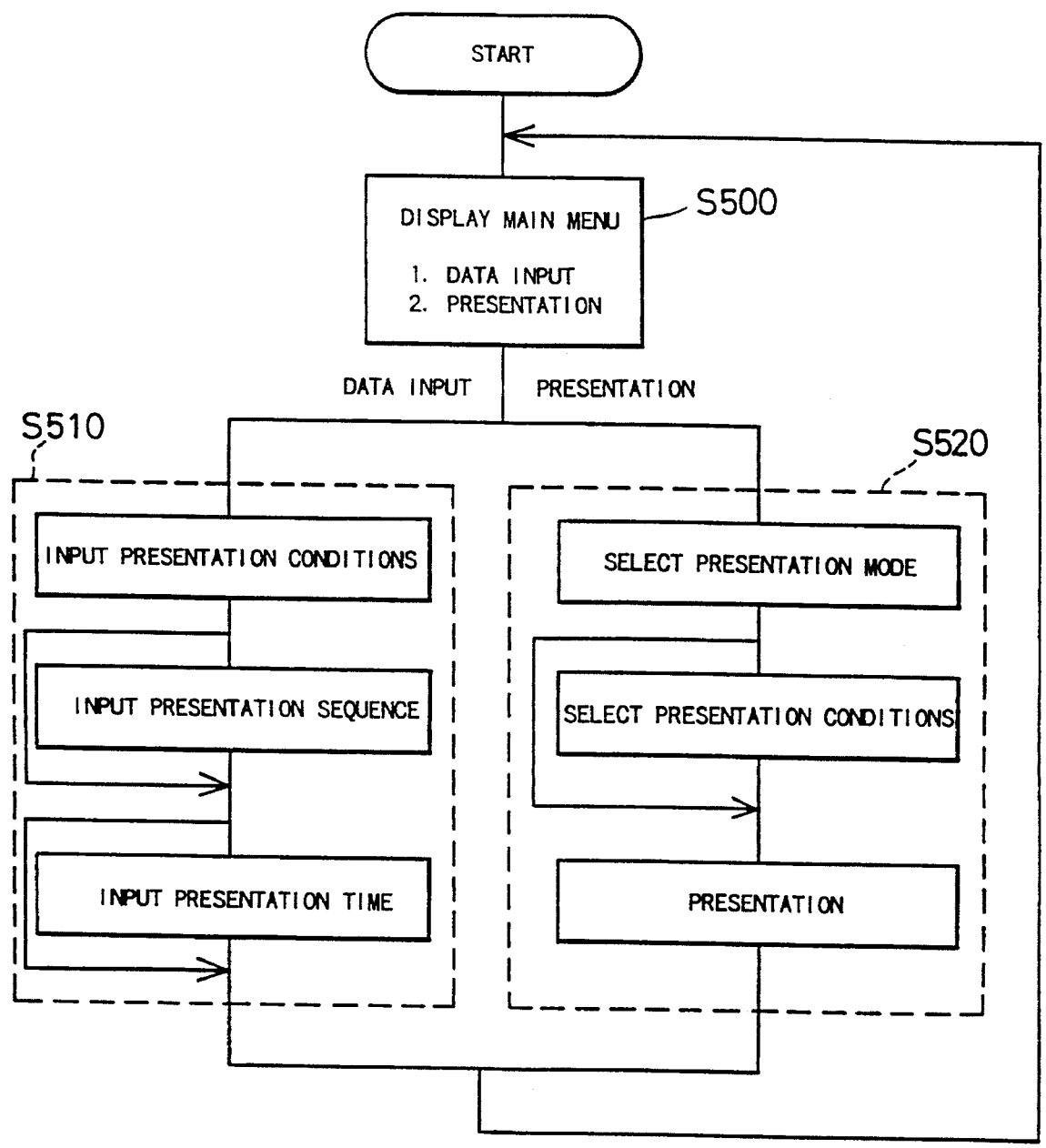
FIG. 25 is a flowchart schematically showing a process executed by a CPU 450 of the external controller 400.
Figure 26:
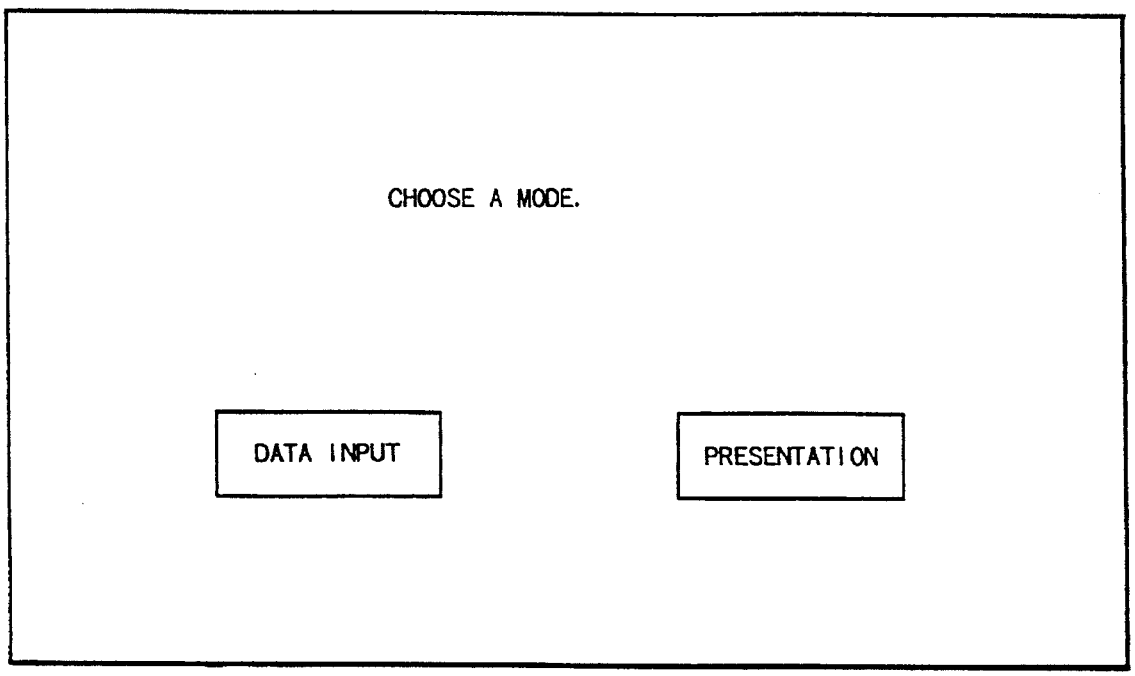
FIG. 26 shows a main menu displayed on a screen 410 at the start-up of the external controller 400.
Figure 27A:
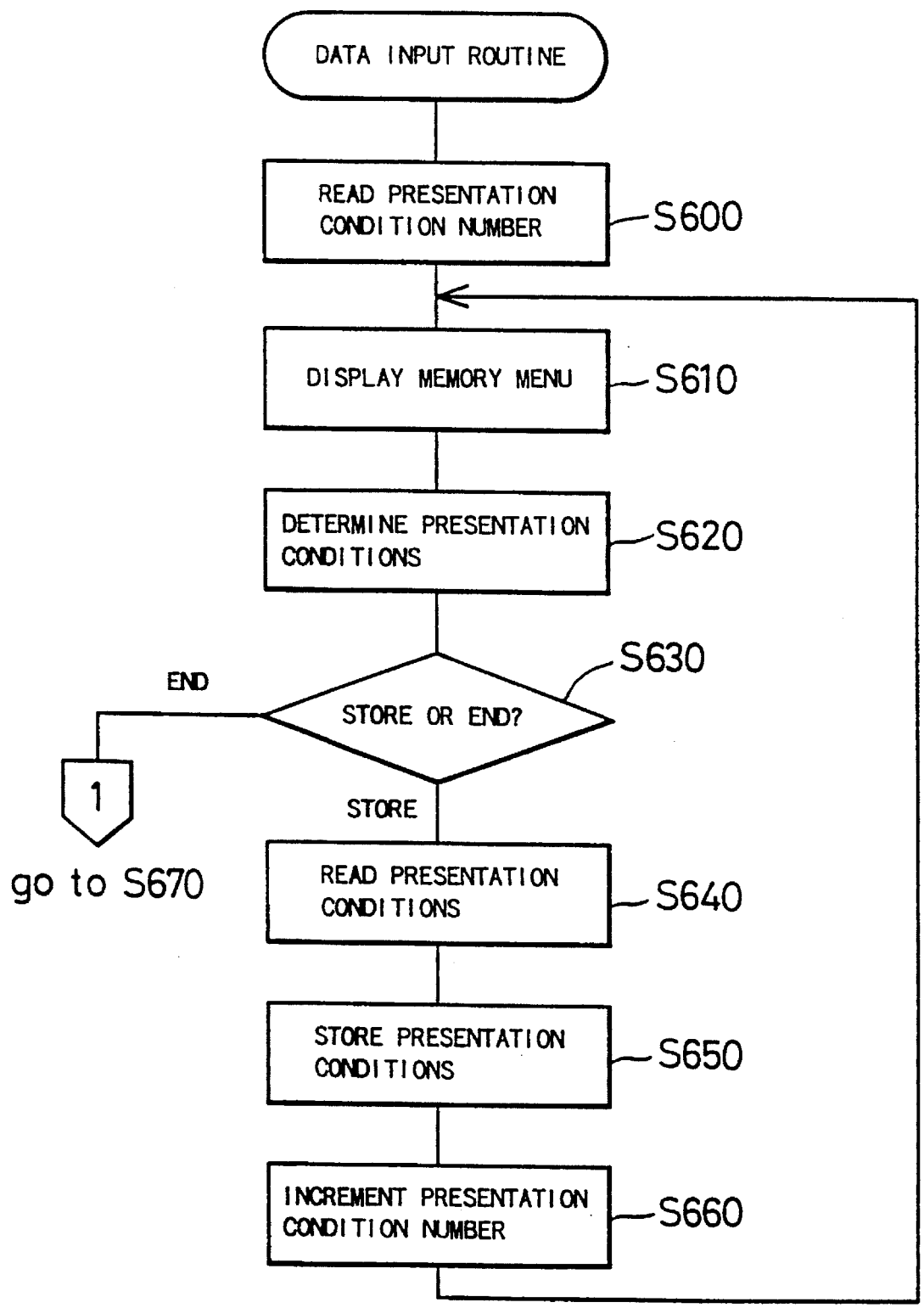
FIGS. 27A and 27B are flowcharts showing a data input routine executed by the CPU 450 of the external controller 400.
Figure 27B:
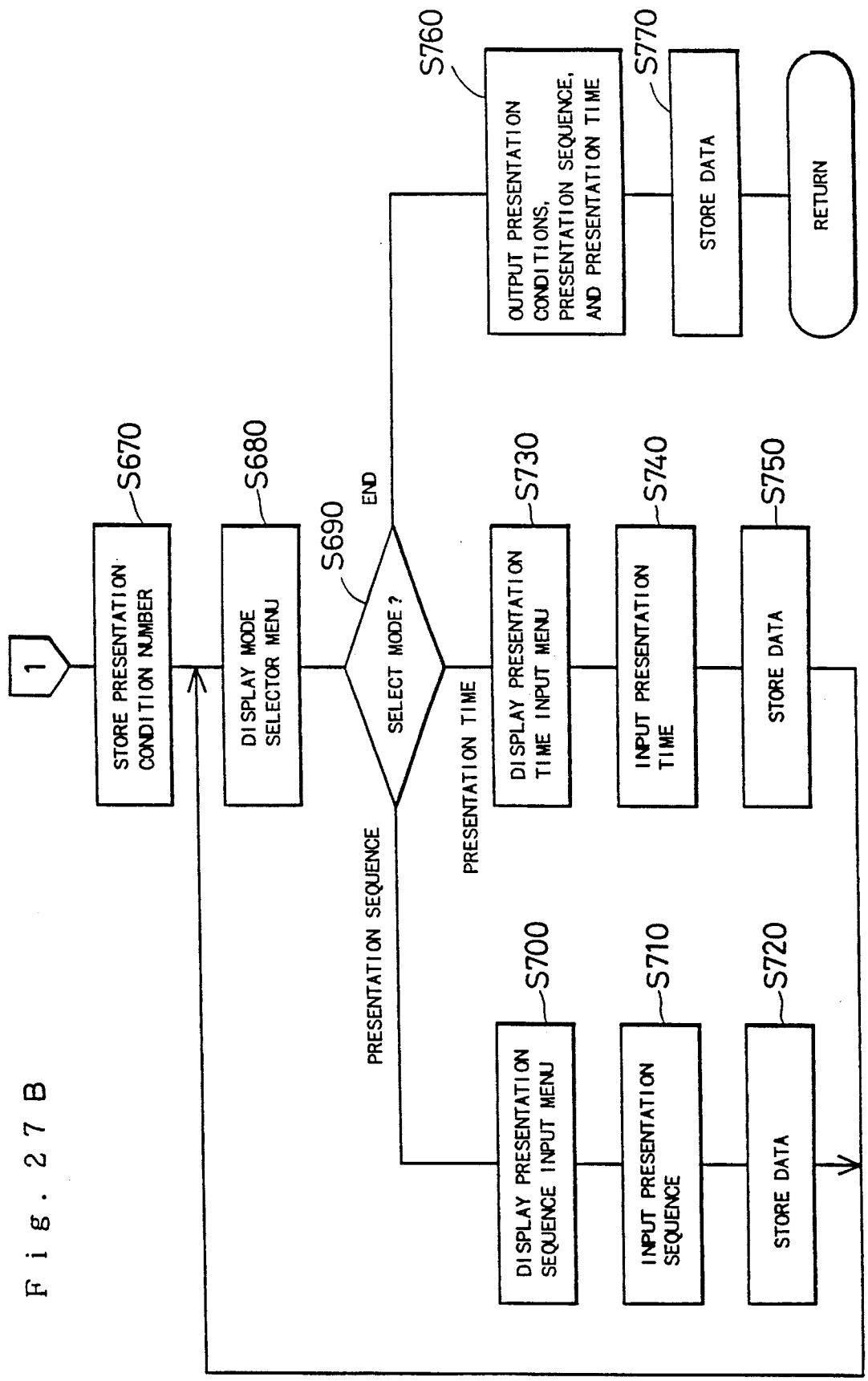
Figure 33A:
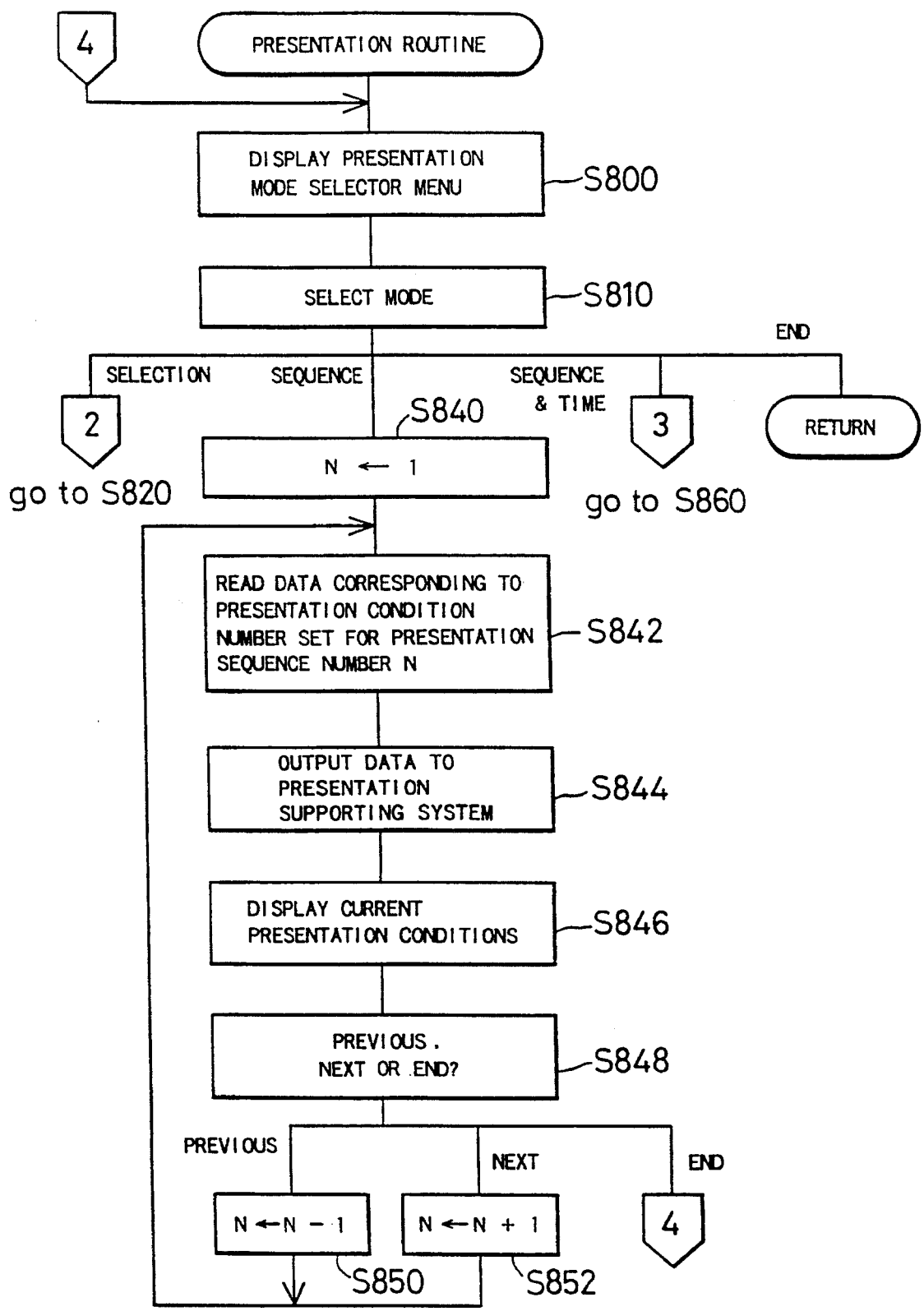
FIGS. 33A through 33C are flowcharts showing a presentation routine executed by the CPU 450 of the external controller 400.
Figure 33B:
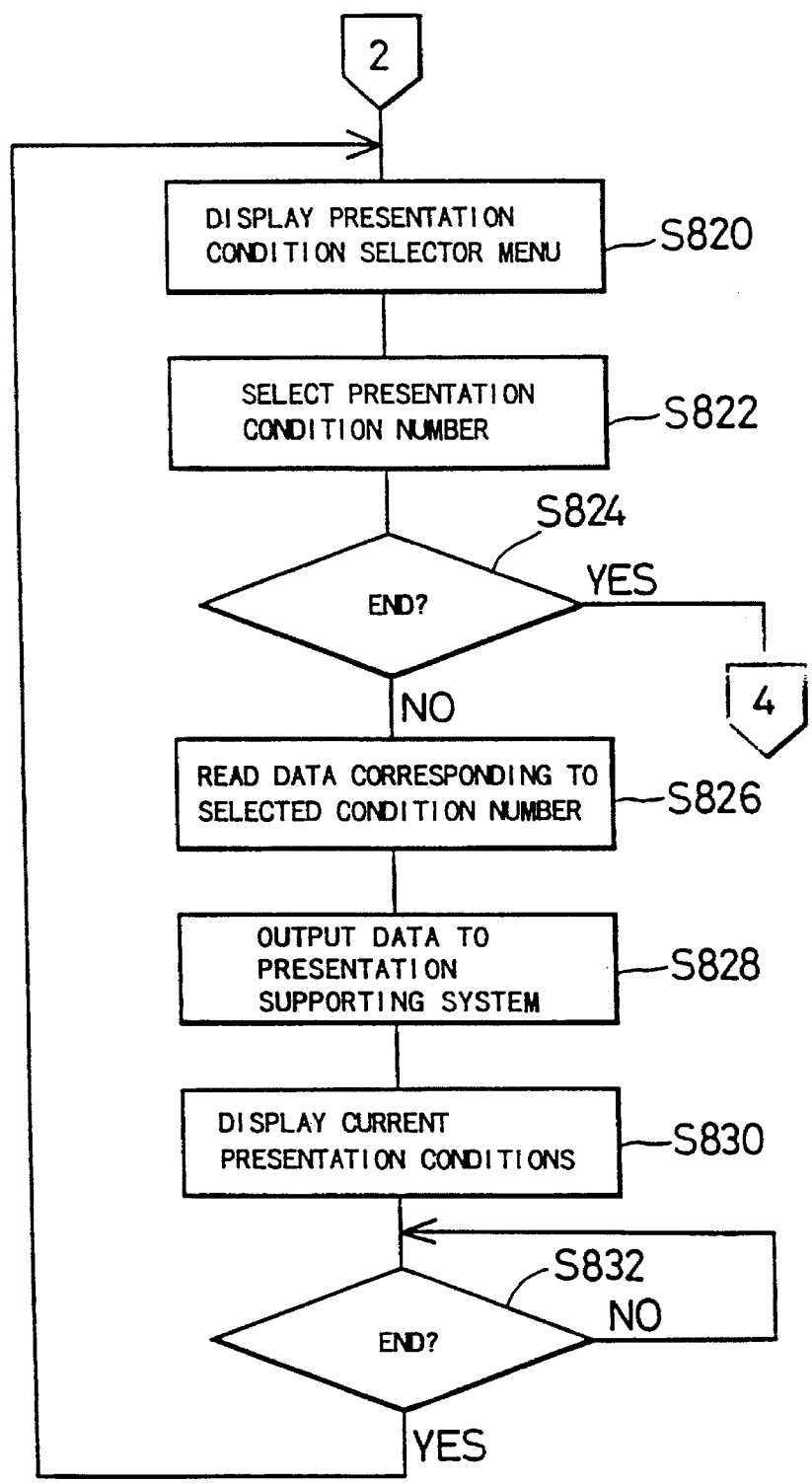
Figure 33C:
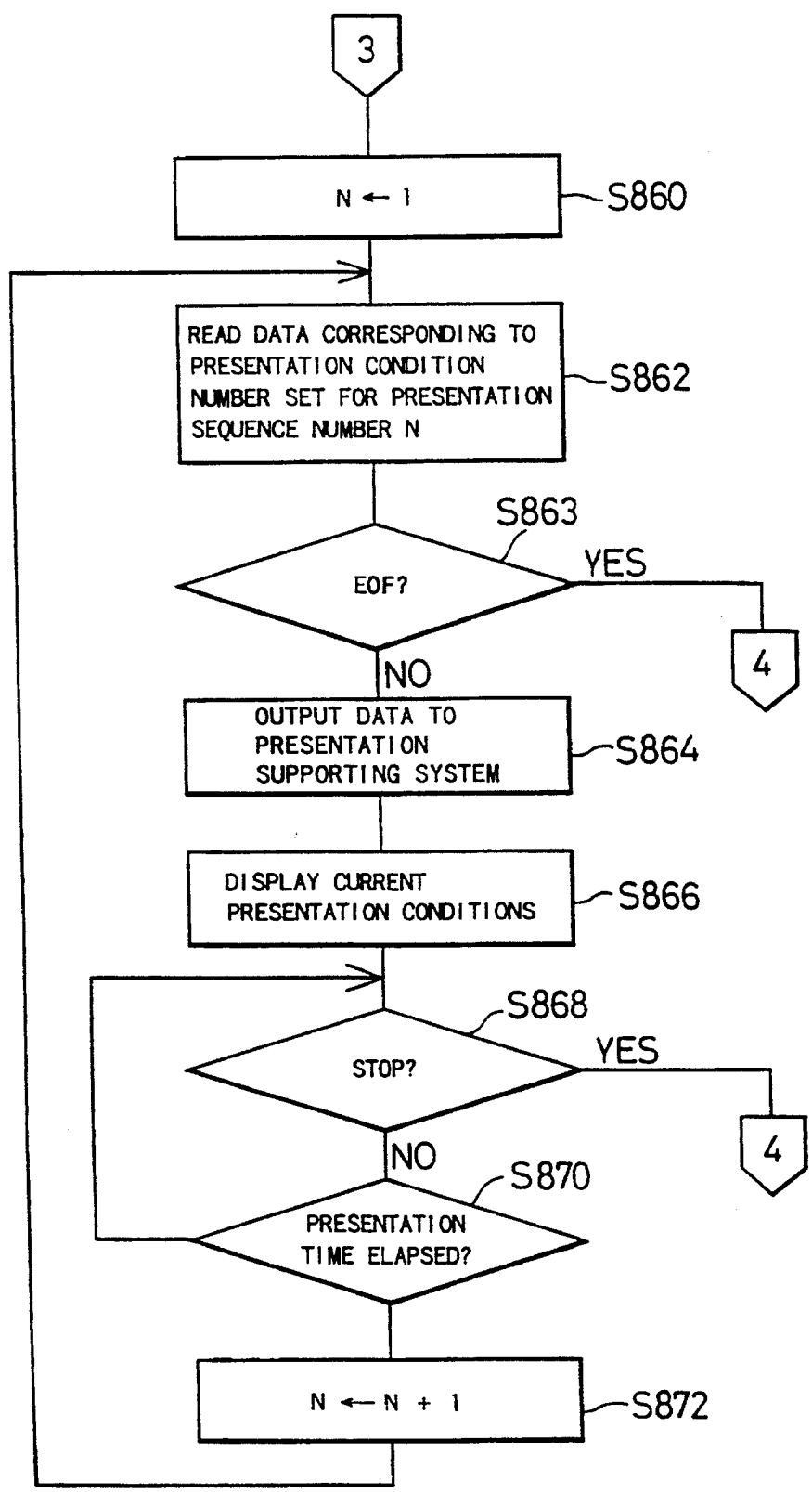

Operation of the external controller 400 and the presentation supporting system 10 is described according to the flowchart of FIG. 25 schematically showing a process executed by the external controller 400. When the power switch 430 of the external controller 400 is turned ON, a main menu MG typically shown in FIG. 26 is displayed on the screen 410 at step S500. According to an operator's selection of either a 'Data Input' mode or a 'Presentation' mode on the main menu MG, the program proceeds to either step S510 for a data input routine or step S520 for a presentation routine. Details of the data input routine are shown in the flowcharts of FIGS. 27A and 27B while details of the presentation routine are shown in the flowcharts of FIGS. 33A through 33C. The operator selects either the 'Data Input' mode or the 'Presentation' mode by touching a 'Data Input' box or a 'Presentation' box displayed on the screen 410. When the operator touches the screen 410, the CPU 450 recognizes the position on the screen 410 as data in X and Y directions on the touch panel 414 via the touch panel interface 460. After execution of the process in the selected mode, 'Data Input' or 'Presentation', the program returns to step S500 to display the main menu MG again on the screen 410 to wait for next selection of the mode.

When the 'Data Input' mode is selected on the main menu MG at step S500 of FIG. 25, the program enters the data input routine of FIGS. 27A and 27B. At step S600 in the flowchart of FIG. 27A, the CPU 450 reads a presentation condition number, which is given to every set of presentation conditions stored. The presentation condition number is initialized to one at a predetermined address of the RAM 454 by an initialization routine (not shown) executed immediately after a power-ON. The presentation condition number is written at a predetermined address of the RAM 454 when an 'End' box is selected on a memory menu G1 described below.

Figure 28:
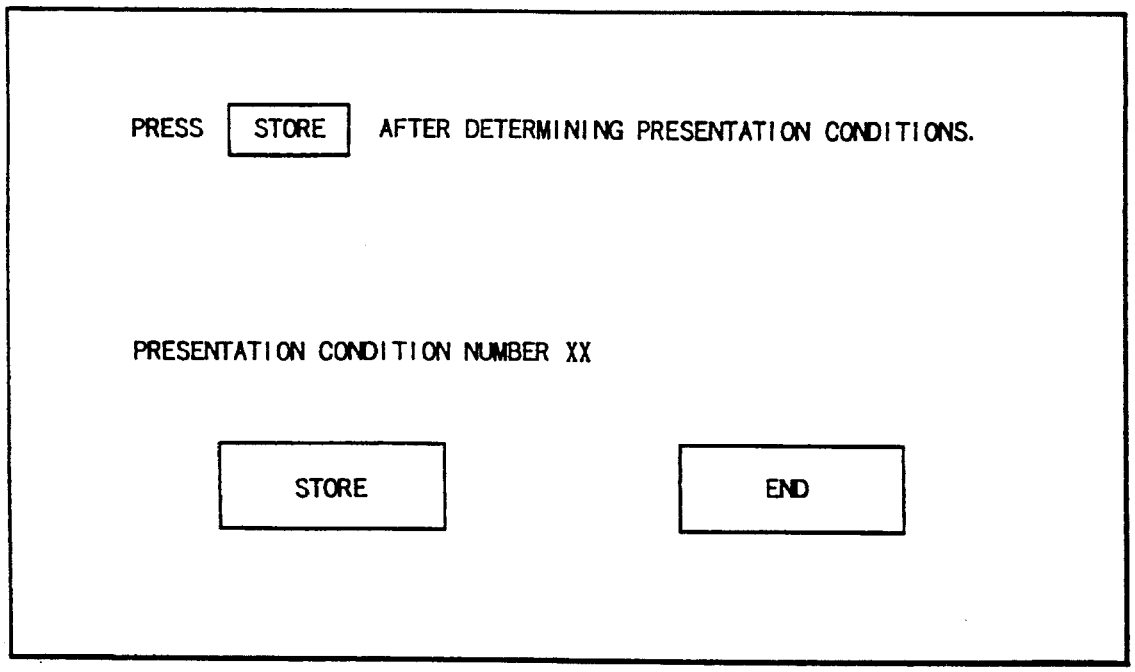
FIG. 28 shows a memory menu G1 displayed on the screen 410.

The program then proceeds to step S610 at which the memory menu G1 typically shown in FIG. 28 is displayed on the screen 410. The memory menu G1 includes a 'Store' box and the 'End' box as well as a presentation condition number. The memory menu G1 continues on the screen 410 until either the 'Store' box or the 'End' box is selected at step S630. While the memory menu G1 is on the screen 410, the operator determines desirable presentation conditions through operation of the control buttons on the front operation panel 28 and the control panel 29 of the presentation supporting system 10 at step S620. When the operator touches the 'Store' box on the screen 410 at step S630 after determination of the desirable presentation conditions in the presentation supporting system 10, the program goes to step S640 at which the CPU 450 outputs a signal for requiring transmission of data representing the current presentation conditions of the presentation supporting system 10, to the CPU 301 of the presentation supporting system 10 via the line driver/receiver circuit 480 of the external controller 400 and the line driver/receiver circuit 336 of the presentation supporting system 10, and receives data of the current presentation conditions of the presentation supporting system 10 transmitted from the CPU 301 in response to the signal.

At step S650, the CPU 450 writes the received data of the presentation conditions at a certain address of the RAM 454 determined according to the presentation condition number. The program then goes to step S660 at which the presentation condition number is incremented by one, and returns to step S610 to display the memory menu G1 again. Plural sets of presentation conditions are stored in the RAM 454 by repeatedly executing steps S610 through S660. Although the presentation condition number is incremented by one every time when each set of presentation conditions are stored in the structure of the embodiment, the presentation condition number may be input on the memory menu G1 from the ten-key pad 420.

When the 'End' box is selected on the memory menu G1 at step S630, the program goes to step S670 of FIG. 27B at which the CPU 450 writes the presentation condition number at a predetermined address of the RAM 454. The program then proceeds to step S680 at which a mode selector menu G2 typically shown in FIG. 29 is displayed on the screen 410. The mode selector menu G2 includes a 'Presentation Sequence' box for setting a presentation sequence of plural sets of presentation conditions, a 'Presentation Time' box for setting a plurality of time periods for presentation when a certain material is shown under a selected set of presentation conditions, and an 'End' box to be selected when no further data input is required for the presentation sequence or presentation time.

When the 'Presentation Sequence' box is selected at step S690, the program goes to step S700 at which a presentation sequence input menu G3 typically shown in FIG. 30 is displayed on the screen 410 and to step S710 at which a presentation sequence is input. The presentation sequence input menu G3 is divided into an upper section and a lower section. In the lower section, plural sets of presentation conditions stored as described previously are shown in the order of the presentation condition numbers. Each set of presentation conditions include the type of the material (negative or positive), the size of the material, and the zoom view angle. Numbers in the presentation sequence with the corresponding sets of presentation conditions are scrolled up or down by five every time when the operator touches a 'Previous Page' box or a 'Next Page' box arranged on the right side of the lower section.

The upper section of the presentation sequence input menu G3 includes a presentation sequence and a plurality of number boxes where presentation condition numbers are input according to the presentation sequence. On the display of the presentation sequence input menu G3, the cursor is blinked on a first number box corresponding to Number 1 in the presentation sequence to wait for input of the first data. Under such an initialization condition, the operator inputs a desired presentation condition number into the first number box with the cursor blinked thereon through operation of the ten-key pad 420 or by touching a desired presentation condition number or a set of presentation conditions corresponding to the desired number displayed on the lower section of the presentation sequence input menu G3. After input of the desired presentation condition number into the first number box, the cursor moves to a second number box corresponding to Number 2 in the presentation sequence to wait for input of a presentation condition number into the second number box. Desired presentation condition numbers are successively input according to the presentation sequence in the above manner.

The presentation condition numbers may be input at random instead of according to the presentation sequence. In this case, the operator first touches a desired number in the presentation sequence or a number box corresponding to the desired number so as to move the cursor to the number box of the desired number and wait for data input. The operator then inputs a desired presentation condition number into the selected number box with the cursor blinked thereon as described above. After data input into the selected number box, the cursor moves to and is blinked on a next number box in the presentation sequence. The operator again touches a desired number in the presentation sequence or a number box corresponding to the desired number for input of next data.

After data input into the first through tenth number boxes, the upper section of the presentation sequence input menu G3 shows sixth through fifteenth number boxes in place of the first through tenth number boxes, and the cursor is blinked on an eleventh number box to wait for data input. When the operator touches a 'Previous Page' box or a 'Next Page' box arranged on the right side of the upper section on the menu G3, numbers in the presentation sequence with number boxes are scrolled left or right by five on the screen 410. When the operator touches an 'INS' box while the cursor is blinked on a certain number box corresponding to a certain number in the presentation sequence, a new set of a presentation number and a number box is inserted before the set of the certain number and number box, and numbers in the presentation sequence after the certain number are respectively incremented by one. When the operator touches a 'DEL' box, on the contrary, a certain number and a corresponding number box with the cursor blinked thereon are deleted from the presentation sequence, and numbers in the presentation sequence after the certain number are decremented by one.

When the operator touches an 'End' box in the lower section of the menu G3 after input of the presentation sequence at step S710, the program goes to step S720 at which data representing the presentation sequence is written at a predetermined address of the RAM 454. The program then returns to step S680 to display the mode selector menu G2 on the screen 410. When the operator touches the 'End' box under such a condition that there are one or a plurality of vacant number boxes with no presentation condition numbers, these vacant number boxes and corresponding numbers in the presentation sequence are deleted, and the remaining numbers in the presentation sequence are adjusted adequately.

When the 'Presentation Time' mode is selected on the mode selector menu G2 at step S690, the program goes to step S730 at which a presentation time input menu G4 typically shown in FIG. 31 is displayed on the screen 410. The presentation time input menu G4 includes a plurality of time boxes where data of a presentation time period is input for each set of presentation conditions as well as a presentation sequence, presentation condition numbers, and plural sets of presentation conditions corresponding to the presentation condition numbers and including the type of the material, the size of the material, and the zoom view angle. These data are shown in the order of the presentation sequence. When the 'Presentation Time' mode is selected under such a condition that no data has been input for the presentation sequence, the presentation sequence is set in the order of the presentation condition numbers, and the plural sets of presentation conditions are shown in the order of the presentation condition numbers on the presentation time input menu G4. On the display of the presentation time input menu G4, the cursor is blinked on a first time box corresponding to Number 1 in the presentation sequence to wait for data input. Under such an initialization condition, data representing a presentation time is input into the first time box through operation of the ten-key pad 420. After data is input into the first time box, the cursor moves to a second time box corresponding to Number 2 in the presentation sequence to wait for next data input. Data representing presentation time periods may also be input at random instead of according to the presentation sequence. The cursor is moved to a desired time box to wait for input of next data by touching a desired number in the presentation sequence, a desired presentation condition number, a set of presentation conditions corresponding to the desired presentation number, or the desired time box.

After data is input into the first through tenth time boxes, the presentation time input menu G4 shows eleventh through twentieth time boxes in place of the first through tenth time boxes, and the cursor is blinked on an eleventh time box to wait for data input. When the operator touches a 'Previous Page' box or a 'Next Page' box arranged on the right side of the menu G4, numbers in the presentation sequence with the corresponding time boxes and presentation conditions are scrolled up or down by ten on the screen 410. When the operator touches an 's/m' box, the unit of the time period input in each time box is changed from 'second' to 'minute' or vice versa.

When the operator touches an 'End' box on the menu G4 after input of the presentation time periods at step S740, the program goes to step S750 at which data representing the presentation time periods is written at a predetermined address of the RAM 454. The program then returns to step S680 to display the mode selector menu G2 on the screen 410.

When the 'End' box is selected on the mode selector menu G2 at step S690, the program goes to step S760 at which a list G5 of the current presentation sequence, conditions and time periods typically shown in FIG. 32 is displayed on the screen 410. The list G5 includes a presentation sequence, presentation condition numbers, plural sets of presentation conditions corresponding to the presentation condition numbers and including the type of the material, the size of the material, and the zoom view angle, and a plurality of presentation time periods set for the plural sets of presentation conditions. These data are shown in the order of the presentation sequence. When the operator touches the 'End' box on the menu G2 prior to selection of the 'Presentation Sequence' mode, the presentation sequence is determined and displayed in the order of the presentation condition numbers. When the operator touches the 'End' box on the menu G2 prior to selection of the 'Presentation Time' mode, on the other hand, no data are shown in the column of the presentation time periods on the list G5. When the operator touches a 'Previous Page' box or a 'Next Page' box arranged on the upper right corner of the list G5, numbers in the presentation sequence with the corresponding presentation conditions and time periods are scrolled up or down by ten on the screen 410. When the operator touches an 'End' box disposed on the lower right corner of the list G5, the program goes to step S770 at which data representing the presentation sequence and presentation time periods is written at a predetermined address of the RAM 454. The program then exits from this routine and returns to step S500 in the flowchart of FIG. 25 to display the main menu MG on the screen 410.

Figure 34:
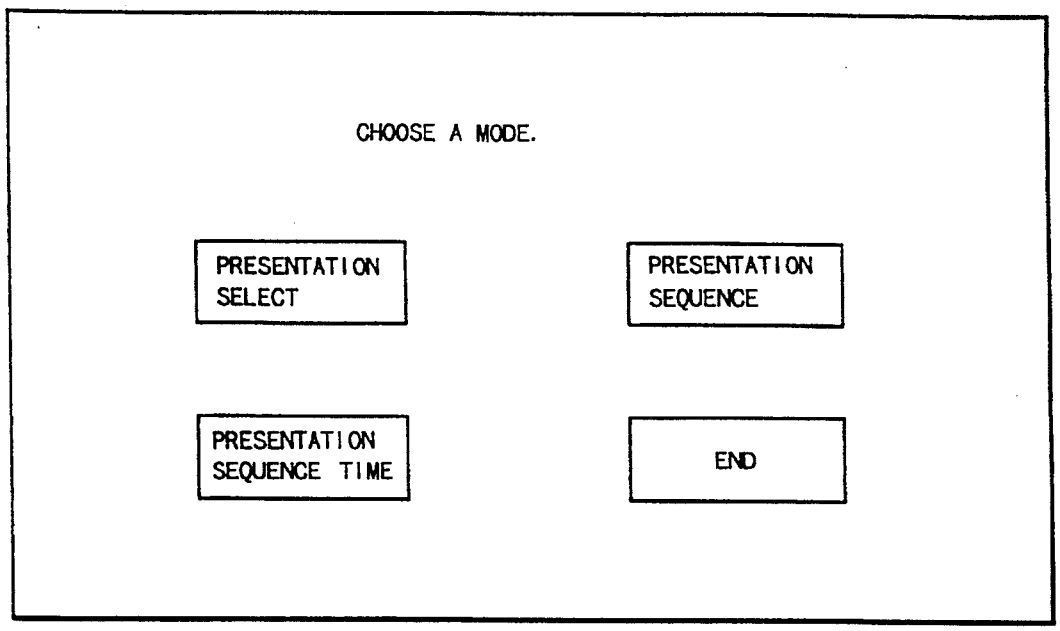
FIG. 34 shows a presentation mode selector menu T1 displayed on the screen 410.

When the 'Presentation' mode is selected on the main menu MG at step S500, a presentation routine shown in the flowcharts of FIGS. 33A through 33C is executed by the CPU 450 of the external controller 400. When the program enters the presentation routine in the flowchart of FIG. 33A, a presentation mode selector menu T1 typically shown in FIG. 34 is displayed on the screen 410 at step S800. The presentation mode selection menu T1 includes three presentation modes shown below and an 'End' mode:

(1) 'Presentation Select' for presentation under a selected presentation condition;

(2) 'Presentation Sequence' for presentation according to the presentation sequence; and (3) 'Presentation Sequence Time' for presentation according to the presentation sequence and time.

Figure 35:
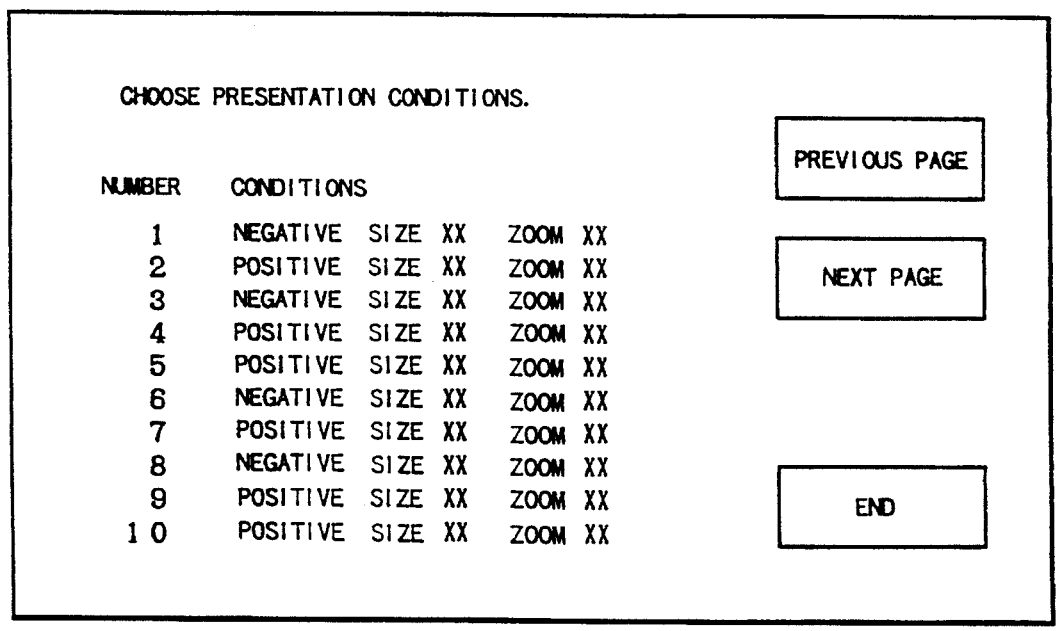
FIG. 35 shows a presentation condition selector menu T2 displayed on the screen 410.

When the 'Presentation Select' mode is selected on the menu T1 at step S810, the program goes to step S820 in the flowchart of FIG. 33B at which a presentation condition selector menu T2 typically shown in FIG. 35 is displayed on the screen 410. The presentation condition selector menu T2 includes presentation condition numbers and plural sets of presentation conditions arranged in the order of the presentation condition numbers and including the type of the material, the size of the material, and the zoom view angle. The operator then selects a desired set of presentation conditions at step S822 by inputting a desired presentation condition number from the ten-key pad 420 or touching a desired presentation condition number or set of presentation conditions on the menu T2. When the operator touches a 'Previous Page' box or a 'Next Page' box on the upper right corner on the menu T2, presentation condition numbers with the corresponding sets of presentation conditions are scrolled up or down by ten.

When a desired presentation condition number is selected at step S822, the program goes to step S824 at which it is determined whether the operator touches the 'End' box on the lower right corner on the menu T2. When the answer is NO at step S824, the program goes to step S826 at which data of a desired set of presentation conditions corresponding to the selected presentation condition number are read out of a predetermined address of the RAM 454. The CPU 450 then transmits the input data representing the desired set of presentation conditions to the presentation supporting system 10 via the line driver/receiver circuit 480 of the external controller 400 and the line driver/receiver circuit 336 of the presentation supporting system 10 at step S828. The presentation supporting system 10 is accordingly set under the transmitted set of presentation conditions previously adjusted and stored for the material. The program then goes to step S830 at which a list T3 of the current presentation conditions typically shown in FIG. 36 is displayed on the screen 410. The list T3 includes a selected presentation condition number and the corresponding set of presentation conditions including the type of the material, the size of the material, the position of display, and the zoom view angle. In this manner, the operator can check the presentation conditions currently set in the presentation supporting system 10 by reading the list T3 displayed on the screen 410 of the external controller 400.

When the operator touches an 'End' box arranged on the lower right corner of the list T3 at step S832, the program returns to step S820 to display the presentation condition selector menu T2 on the screen 410. The presentation supporting system 10 is maintained under the transmitted set of presentation conditions until a next set of presentation conditions is selected and transmitted. When the operator touches the 'End' box on the lower right corner of the menu T2 at step S824, the program returns to step S800 in the flowchart of FIG. 33A to display the presentation mode selector menu T1 on the screen 410 and wait for next mode selection.

When the 'Presentation Sequence' mode is selected on the menu T1 at step S810, the program goes to step S840 in the flowchart of FIG. 33A at which an initial value '1' is set in a presentation sequence number N. In the 'Presentation Sequence' mode, presentation conditions are changed according to the presentation sequence. The CPU 450 reads data representing a certain set of presentation conditions corresponding to a presentation condition number set for the presentation sequence number N out of a predetermined address of the RAM 454 at step S842. The CPU 450 then transmits the input data representing the set of presentation conditions to the CPU 301 of the presentation supporting system 10 via the line driver/receiver circuit 480 of the external controller 400 and the line driver/receiver circuit 336 of the presentation supporting system 10 at step S844. The presentation supporting system 10 is accordingly set under the transmitted set of presentation conditions.

After the CPU 450 transmit s the input data to the presentation supporting system 10, the program goes to step S846 at which a menu T4 for changing presentation conditions typically shown in FIG. 37 is displayed on the screen 410. The menu T4 includes a selected presentation sequence number, the corresponding presentation condition number, and the corresponding set of presentation conditions currently set in the presentation supporting system 10 and including the type of the material, the size of the material, the position of display, and the zoom view angle. When the operator touches a 'Previous' box or a 'Next' box disposed on the right side of the menu T4 at step S848, the program goes to step S850 to decrement the presentation sequence number N by one or to step S852 to increment the presentation sequence number N by one, and returns to step S842 to read next data corresponding to the decremented or incremented presentation sequence number. Through selection of the 'Previous' box or the 'Next' box, presentation conditions set in the presentation supporting system 10 are changed according to the presentation sequence. The presentation supporting system 10 is maintained under the transmitted set of presentation conditions until a next set of presentation conditions is selected and transmitted.

When the operator touches an 'End' box on the lower right corner of the menu T4 at step S848, the program stops the process in the 'Presentation Sequence' mode and immediately returns to step S800 in the flowchart of FIG. 33A to display the presentation mode selector menu T1 on the screen 410 and wait for next mode selection.

When the 'Presentation Sequence Time' mode is selected on the menu T1 at step S810, the program goes to step S860 in the flowchart of FIG. 33C at which an initial value '1' is set in a presentation sequence number N. In the 'Presentation Sequence Time' mode, presentation conditions are changed according to the presentation sequence and time. The CPU 450 reads data representing a certain set of presentation conditions corresponding to a presentation condition number set for the presentation sequence number N out of a predetermined address of the RAM 454 at step S862. When no data to be input exits at the predetermined address of the RAM 454, an 'EOF' flag is set to show existence of no input data. When the 'EOF' flag is set at step S863, the program stops the process in the 'Presentation Sequence Time' mode and returns to step S800 in the flowchart of FIG. 33A. This 'EOF' flag is generally set after display of the last set of presentation conditions according to the presentation sequence. The CPU 450 then transmits the input data representing the set of presentation conditions to the CPU 301 of the presentation supporting system 10 via the line driver/receiver circuit 480 of the external controller 400 and the line driver/receiver circuit 336 of the presentation supporting system 10 at step S864. The presentation supporting system 10 is accordingly set under the transmitted set of presentation conditions.

After the CPU 450 transmits the input data to the presentation supporting system 10, the program goes to step S866 at which a list T5 of the current presentation conditions and time typically shown in FIG. 38 is displayed on the screen 410. The list T5 includes a presentation time and a time elapsed as well as a selected presentation sequence number, the corresponding presentation condition number, and the corresponding set of presentation conditions currently set in the presentation supporting system 10 and including the type of the material, the size of the material, the position of display, and the zoom view angle. The time elapsed represents a time period elapsed after transmission of a certain set of presentation conditions to the presentation supporting system 10. When a set of presentation conditions are transmitted to the presentation supporting system 10, a timer (not shown) built in the external controller 400 is reset to count a time period elapsed. When the time period elapsed becomes equal to the preset presentation time at step S870, the program goes to step S872 at which the presentation sequence number N is incremented by one, and then returns to step S862 to transmit another set of presentation conditions corresponding to the incremented presentation sequence number N to the presentation supporting system 10. By repeatedly executing steps S862 through S872, presentation conditions set in the presentation supporting system 10 are changed according to the preset presentation sequence and the preset presentation time.

When the operator touches a 'Stop' box disposed on the lower right corner of the list T5 during execution of any step S862 through S872, the program immediately stops the process in the 'Presentation Sequence Time' mode and returns to step S800 in the flowchart of FIG. 33A to display the presentation mode selector menu T1 on the screen 410 and wait for next mode selection.

When the 'End' box is selected on the presentation mode selector menu T1 at step S810, the program returns to step S500 in the flowchart of FIG. 25 to display the main menu MG shown in FIG. 26 on the screen to wait for next mode selection.

The presentation supporting system 10 described above uses the external controller 400 to store a variety of presentation conditions including selection of the auxiliary lighting units 22 or the base light unit, selection of input data, the microphone volume, and the position of the video camera 20. A desired set of presentation conditions is readily selected out of the plural sets with the presentation condition selector menu T2 displayed on the screen 410 of the controller 400, and is then transmitted to the presentation supporting system 10, which is accordingly set under the transmitted set of presentation conditions. This allows one or a plurality of operators to efficiently set desired presentation conditions for a variety of materials in the presentation supporting system 10.

The external controller 400 is also utilized to set a presentation sequence for presentation condition numbers corresponding to the plural sets of presentation conditions thus stored. In such a case, presentation conditions set in the presentation supporting system 10 are automatically changed only by varying the presentation condition numbers according to the presentation sequence. It is accordingly not necessary to adjust or select the presentation conditions in the presentation supporting system 10 every time when a new material is shown in a lecture, meeting, or presentation. The external controller 400 is further utilized to determine a plurality of time periods for presentation when a certain material is shown under a selected set of presentation conditions as well as the presentation sequence. Presentation conditions set in the presentation supporting system 10 are changed every time when a preset presentation time period has elapsed according to the presentation sequence. This is especially preferable when a presentation time period for showing a certain material is previously determined.

In the presentation supporting system 10 of the embodiment, the direction of the video camera 20 is adequately adjusted to allow a plurality of materials placed simultaneously on the table 12 to be shown successively. Under such a condition that the presentation sequence and presentation time periods are previously determined with the external controller 400 as described above, the presentation supporting system 10 is allowed to automatically project reproduction images of these materials on the table 12 in succession according to the preset sequence and time periods only by operating the external controller 400 once before start of presentation. This procedure is described more concretely. While a plurality of materials are placed on the table 12 of the presentation supporting system 10, the external controller 400 is used to store plural sets of presentation conditions required for the materials and specify a desired presentation sequence and plurality of presentation time periods for the plural sets of presentation conditions. By selecting the 'Presentation Sequence Time' mode on the presentation mode selector menu T1 of the controller 400, the plurality of materials are successively projected according to the specified presentation sequence and time periods by the presentation supporting system 10. The combined use of the presentation supporting system 10 and the external controller 400 remarkably improves the efficiency of presentation.

The external controller 400 separately formed from the presentation supporting system 10 can be used as a remote control of the presentation supporting system 10. The external controller 400 is communicated with the presentation supporting system 10 via an RS-232C communication circuit, and the controller 400 may thus be applicable to another presentation supporting system having the same communication system.

In the above embodiment, the camera body 20a may be constructed to allow rotation around a shooting direction. In such a structure, a reproduction image of a certain material placed on the table 12 of the presentation supporting system 10 can be rotated without actually moving the material. When the presentation supporting system 10 is further provided with a mechanism for detecting an inclination of the material placed on the table 12, the camera body 20a is rotated according to the inclination of the material to output a reproduction image with no inclination. For example, a predetermined symbol such as '+' is placed on four corners or any selected positions of the material, and the inclination of the material is determined according to positions of the symbols in an image of the material. The camera body 20a is then rotated according to the inclination to compensate for the inclination and output a reproduction image with no inclination. This mechanism saves labor and time of the operator for placing the material flat on the table with great care.

Other possible methods of detecting an inclination of the material include a process of detecting an inclination of a straight line previously drawn on a selected side of the material, a process of detecting an inclination of frame lines in a table included in the material, and a process of detecting an inclination of a rectangular sheet material or a rectangular bottom face of a three-dimensional material.

Although plural sets of presentation conditions are stored in the RAM 454 of the external controller 400 in the above embodiment, the external controller 400 may be provided with an external memory unit such as an IC card interface or a flexible disk drive unit to store the presentation conditions. In this structure, desired sets of presentation conditions stored in the external memory unit are read into the external controller 400 according to the requirements so as to control the presentation supporting system 10.

Since there may be many other changes, modification, and alterations without departing from the scope or spirit of essential characteristics of the invention, it is clearly understood that the above embodiment is only illustrative and not restrictive in any sense. Some examples of modification include a structure for storing presentation conditions into a battery back-up RAM, a structure for storing a plurality of presentation sequences, a structure for numerically inputting presentation conditions to the presentation supporting system, a structure where the presentation supporting system has a function of storing presentation conditions and specifying the presentation sequence and time periods, and a structure where the controller is communicated with the presentation supporting system not by a communication cable but via optical or electromagnetic communication.

In the presentation supporting system of the invention described above, when the video camera for taking a visual image of the material is held on a predetermined camera position above the table, the camera supporting arm member with the video camera held thereon is coupled with the camera supporting base member fixed to the table to allow pivotal movement of the arm member towards the table. The camera supporting arm member is pivotably moved and folded towards the table to move the video camera from the camera position to a predetermined position close to and directly above the upper face of the table.

The presentation supporting system of the invention is compactly packed or stored under a non-service condition by simply folding the camera supporting arm member towards the table to locate the video camera directly above and close to the upper face of the table. This saves labor, space and materials required for packing. Since the video camera is positioned directly above the table, a packaging box is not required to have a complicated shape as a conventional presentation supporting system. The compact packaging of the presentation supporting system in the simple shape of the box improves the packing efficiency in a container and reduces the shipment cost.

In the presentation supporting system of the invention, the camera supporting arm member is joined with the camera supporting base member with an identical fixation member under both a service condition where the video camera is located at the predetermined camera position above the table or a non-service condition where the camera supporting arm member is folded towards the table. This effectively prevents the fixation member from being lost by accident.

The cushioning member of the invention is interposed between the video camera and the table under a non-service condition where the camera supporting arm member is folded towards the table to hold the video camera at a resting position, and effectively protects the video camera from being damaged.

In the presentation supporting system of the invention, a variety of presentation conditions including a shooting condition and a sound volume are stored in the memory unit when a predetermined first condition is fulfilled through operation of selected control buttons. The presentation conditions thus stored are recovered when a predetermined second condition is fulfilled through a power supply or operation of certain control buttons. Once a desired set of presentation conditions are set in the presentation supporting system, the desired conditions can be recovered any time according to the requirements, for example, on every power supply. This structure allows desired or optimal settings to be recovered without any trouble even when a plurality of operators use the presentation supporting system, thus significantly improving the efficiency of presentation.

The presentation supporting system of the invention further has a function of storing a plurality of presentation conditions and selecting a desirable one out of the plurality of presentation conditions according to a subject matter on the table to set the presentation supporting system in the desirable condition. This system does not require adjustment of the presentation conditions every time when a different operator uses the presentation supporting system.

The presentation supporting system may further be provided with a mechanism for adjusting a shooting area on the table. This mechanism allows a desired part of a material on the table to . be shown without moving the material or a plurality of materials on the table to be shown successively.

In the presentation supporting system of the invention, a presentation sequence may be specified for the plurality of presentation conditions previously stored. In this case, one or a plurality of materials can be effectively shown in a lecture or presentation under certain presentation conditions selected according to the presentation sequence. In another application, a plurality of presentation time periods as well as the presentation sequence may be specified for the plurality of presentation conditions. In such a case, the presentation conditions set in the presentation supporting system are changed according to the presentation sequence every time when each preset presentation time period has elapsed. This allows a plurality of materials to be shown successively under the respective presentation conditions specified according to the presentation sequence and time. When the presentation supporting system has a combined function of adjusting the shooting area and specifying the presentation sequence and time, a plurality of materials placed on the table are allowed to be successively projected according to the preset presentation sequence and time periods.

The controller device of the invention can be connected to the presentation supporting system to store a plurality of presentation conditions and select a desirable one out of the plurality of conditions so as to set the presentation supporting system in the desirable condition.

The spirit and scope of the present invention is limited only by the terms of the appended claims.

What is claimed is:

1. An image reproduction apparatus comprising camera means for taking a visual image of a material, a sample, or another subject matter placed on a table, an image signal representing the visual image of said subject matter taken by said camera means being transmitted to an external display unit to show a reproduction image of said subject matter, said image reproduction apparatus further comprising presentation condition adjustment means for adjusting a presentation condition for said subject matter, memory means for storing a plurality of presentation condition groups including a plurality of predetermined presentation conditions adjusted by said presentation condition adjustment means, presentation condition selection means for selecting one of said plurality of presentation condition groups stored in said memory means, and presentation condition setting means for setting presentation conditions included in said one presentation condition group selected by said presentation condition selection means in said presentation supporting system.

2. An image production apparatus in accordance with claim 1, said apparatus further comprising sequence specification means for specifying a sequence of said plurality of presentation condition groups stored in said memory means, wherein said presentation condition selection means selects each of said plurality of presentation condition groups according to the sequence specified by said sequence specification means.

3. A presentation supporting system comprising camera means for taking a visual image of a material, a sample, or another subject matter placed on a table, an image signal representing the visual image of said subject matter taken by said camera means being transmitted to an external display unit to show a reproduction image of said subject matter, said presentation supporting system further comprising presentation condition adjustment means for adjusting a presentation condition for said subject matter, memory means for storing a plurality of presentation conditions adjusted by said presentation condition adjustment means, presentation condition selection means for selecting one of said plurality of presentation conditions stored in said memory means, and presentation condition setting means for setting said one presentation condition selected by said presentation condition selection means in said presentation supporting system, said presentation condition adjustment means adjusting a first presentation condition concerning with a light source for irradiating said subject matter on said table, a second presentation condition concerning with settings of said camera means for taking the visual image of said subject matter on said table, and a third presentation condition concerning with a display mode for outputting the visual image of said subject matter, said presentation condition selection means selecting one out of said first, second, and third presentation conditions.

4. A presentation supporting system comprising camera means for taking a visual image of a material, a sample, or another subject matter placed on a table, an image signal representing the visual image of said subject matter taken by said camera means being transmitted to an external display unit to show a reproduction image of said subject matter, said presentation supporting system further comprising presentation condition adjustment means for adjusting a presentation condition for said subject matter, memory means for storing a plurality of presentation conditions adjusted by said presentation condition adjustment means, presentation condition selection means for selecting one of said plurality of presentation conditions stored in said memory means, and presentation condition setting means for setting said one presentation condition selected by said presentation condition selection means in said presentation supporting system, said presentation condition adjustment means further comprising shooting range adjustment means for adjusting a shooting range of said camera means on said table.

5. A presentation supporting system in accordance with claim 4, wherein said shooting range adjustment means adjusts a shooting direction of said camera means for taking the visual image of said subject matter.

6. A presentation supporting system in accordance with claim 5, wherein said shooting range adjustment means sets the shooting direction of said camera means in an arbitrary area selected among a center area, a front area, a rear area, a right area, and a left area on a top face of said table.

7. A presentation supporting system comprising camera means for taking a visual image of a material, a sample, or another subject matter placed on a table, an image signal representing the visual image of said subject matter taken by said camera means being transmitted to an external display unit to show a reproduction image of said subject matter, said presentation supporting system further comprising presentation condition adjustment means for adjusting a presentation condition for said subject matter, memory means for storing a plurality of presentation conditions adjusted by said presentation condition adjustment means, presentation condition selection means for selecting one of said plurality of presentation conditions stored in said memory means, and presentation condition setting means for setting said one presentation condition selected by said presentation condition selection means in said presentation supporting system, sequence specification means for specifying a sequence of said plurality of presentation conditions stored in said memory means, and presentation time specification means for specifying a presentation time period when one of said plurality of presentation conditions is set according to the sequence specified by said sequence specification means, wherein said presentation condition selection means selects one of said plurality of presentation conditions according to the sequence specified by said sequence specification means every time when the presentation time period specified by said presentation time specification means has elapsed.

8. A controller device used for an image reproduction apparatus for taking a visual image of a material, a sample, or another subject matter placed on a table and outputting an image signal representing the visual image of said subject matter to an external display unit to show a reproduction image of said subject matter, said controller device comprising memory means for storing a plurality of presentation condition groups including a plurality of presentation conditions for showing the reproduction image of said subject matter sent from said presentation supporting system;

presentation condition selection means for selecting a presentation condition group out of said plurality of presentation condition groups stored in said memory means, and presentation condition control means for controlling said image reproduction apparatus based on the presentation conditions included in said presentation condition group selected by said presentation condition selection means.

9. A controller device used for a presentation supporting system for taking a visual image of a material, a sample, or another subject matter placed on a table and outputting an image signal representing the visual image of said subject matter to an external display unit to show a reproduction image of said subject matter, said controller device comprising memory means for storing a plurality of presentation conditions for showing the reproduction image of said subject matter sent from said presentation supporting system;

presentation condition selection means for selecting a presentation condition out of said plurality of presentation conditions stored in said memory means, and presentation condition control means for controlling said presentation supporting system based on said presentation condition selected by said presentation condition selection means, said presentation condition selection means selecting one among a first presentation condition concerning with a light source for irradiating said subject matter on said table, a second presentation condition concerning with settings of said camera means for taking the visual image of said subject matter on said table, and a third presentation condition concerning with a display mode for outputting the visual image of said subject matter.

* * * * *